US012598047B2

(12) United States Patent (10) Patent No.: US 12,598,047 B2
Matsumura et al. (45) Date of Patent: Apr. 7, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 404 days.

(21) Appl. No.: 18/557,171

(22) PCT Filed: Mar. 29, 2022

(86) PCT No.: PCT/JP2022/015545
§ 371 (c)(1),
(2) Date: Oct. 25, 2023

(87) PCT Pub. No.: WO2022/249742
PCT Pub. Date: Dec. 1, 2022

(65) Prior Publication Data
US 2024/0214173 A1 Jun. 27, 2024

(30) Foreign Application Priority Data
May 28, 2021 (JP) ................................ 2021-090578

(51) Int. Cl.
*H04W 4/00* (2018.01)
*H04L 5/00* (2006.01)
(52) U.S. Cl.
CPC .................................. *H04L 5/0094* (2013.01)
(58) Field of Classification Search
CPC ..... H04L 5/0094; H04L 5/001; H04L 5/0048; H04W 16/28; H04W 72/04; H04W 76/15
See application file for complete search history.

(56) References Cited

U.S. PATENT DOCUMENTS

2021/0160827 A1* 5/2021 Kim ...................... H04L 5/0053
2022/0046588 A1* 2/2022 Yeo ........................ H04W 72/23
2023/0396375 A1* 12/2023 Muruganathan ...... H04L 5/0091

FOREIGN PATENT DOCUMENTS

JP          2025155667 A  * 10/2025
WO    WO-2020263048 A1 * 12/2020 ............ H04W 72/23
(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
(Continued)

*Primary Examiner* — Thai Dinh Hoang
(74) *Attorney, Agent, or Firm* — Osha Bergman Watanabe & Burton LLP

(57) ABSTRACT

A terminal according to an aspect of the present disclosure includes: a receiving section that receives one or more first radio resource control (RRC) information elements relating to a list of transmission configuration indication (TCI) states including a plurality of TCI states applicable to a plurality of types of channels, and one or more second RRC information elements relating to a configuration of one or more serving cells or one or more bandwidth parts; and a control section that discriminates, in a case where the first RRC information element is not associated with a specific serving cell or a specific bandwidth part, one or more TCI states used for the specific serving cell or the specific bandwidth part, based on the first RRC information element and the second RRC information element, in which the receiving section receives a medium access control (MAC) control element indicating an activated serving cell or bandwidth part, among the one or more serving cells or the one or more bandwidth parts.
(Continued)

qcl-Type1

| Field | value |
| --- | --- |
| Cell | - (absent) |
| bwp-id | - (absent) |
| referenceSignal | NZP CSI-RS #5 |
| qcl-Type | typeA | qcl-Type2

| Field | value |
| --- | --- |
| Cell | - (absent) |
| bwp-id | - (absent) |
| referenceSignal | NZP CSI-RS #5 |
| qcl-Type | typeD |

According to one aspect of the present disclosure, a TCI state indication can be appropriately issued.

5 Claims, 19 Drawing Sheets

(56) References Cited

FOREIGN PATENT DOCUMENTS

| | | | | | |
|---|---|---|---|---|---|
| WO | WO-2021236419 A1 | * | 11/2021 | ............ | H04W 72/51 |
| WO | WO-2022154539 A1 | * | 7/2022 | ............ | H04W 72/23 |
| WO | WO-2022154607 A1 | * | 7/2022 | ............ | H04W 72/23 |
| WO | WO-2022235042 A1 | * | 11/2022 | ........... | H04L 5/0098 |
| WO | WO-2022235086 A1 | * | 11/2022 | ............ | H04W 72/20 |
| WO | WO-2024172369 A1 | * | 8/2024 | ............ | H04B 7/024 |
| WO | WO-2025122840 A1 | * | 6/2025 | .......... | H04W 52/365 |
| WO | WO-2025166389 A2 | * | 8/2025 | .......... | H04W 72/046 |

OTHER PUBLICATIONS

3GPP TSG-RAN WG4 Meeting #92; R4-1908181 "Clarifications in BWP switch requirements" MediaTek Inc.; Ljubljana, Slovenia; Aug. 26-30, 2019 (4 pages).
International Search Report issued in International Application No. PCT/JP2022/015545, mailed Jun. 7, 2022 (3 pages).
Written Opinion issued in International Application No. PCT/JP2022/015545; Dated Jun. 7, 2022 (3 pages).

* cited by examiner

FIG. 2A configuration for DL&UL (RRC)

Figures 2A, 2B:
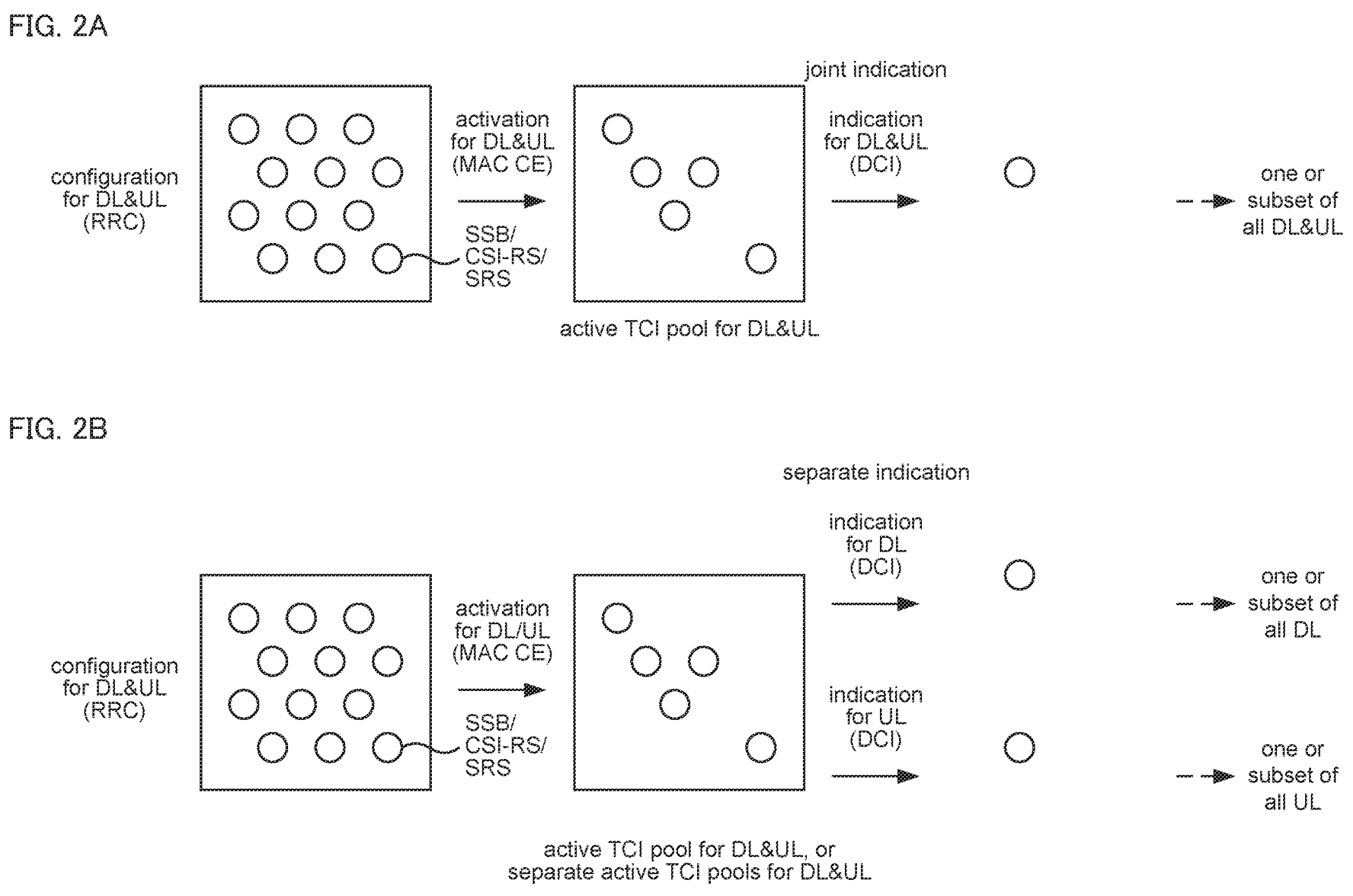

activation for DL&UL (MAC CE)

SSB/ CSI-RS/ SRS active TCI pool for DL&UL joint indication indication for DL&UL (DCI)

one or subset of all DL&UL

FIG. 2B configuration for DL&UL (RRC)

activation for DL/UL (MAC CE)

SSB/ CSI-RS/ SRS active TCI pool for DL&UL, or separate active TCI pools for DL&UL separate indication indication for DL (DCI)

indication for UL (DCI)

one or subset of all DL one or subset of all UL

Figure 5:
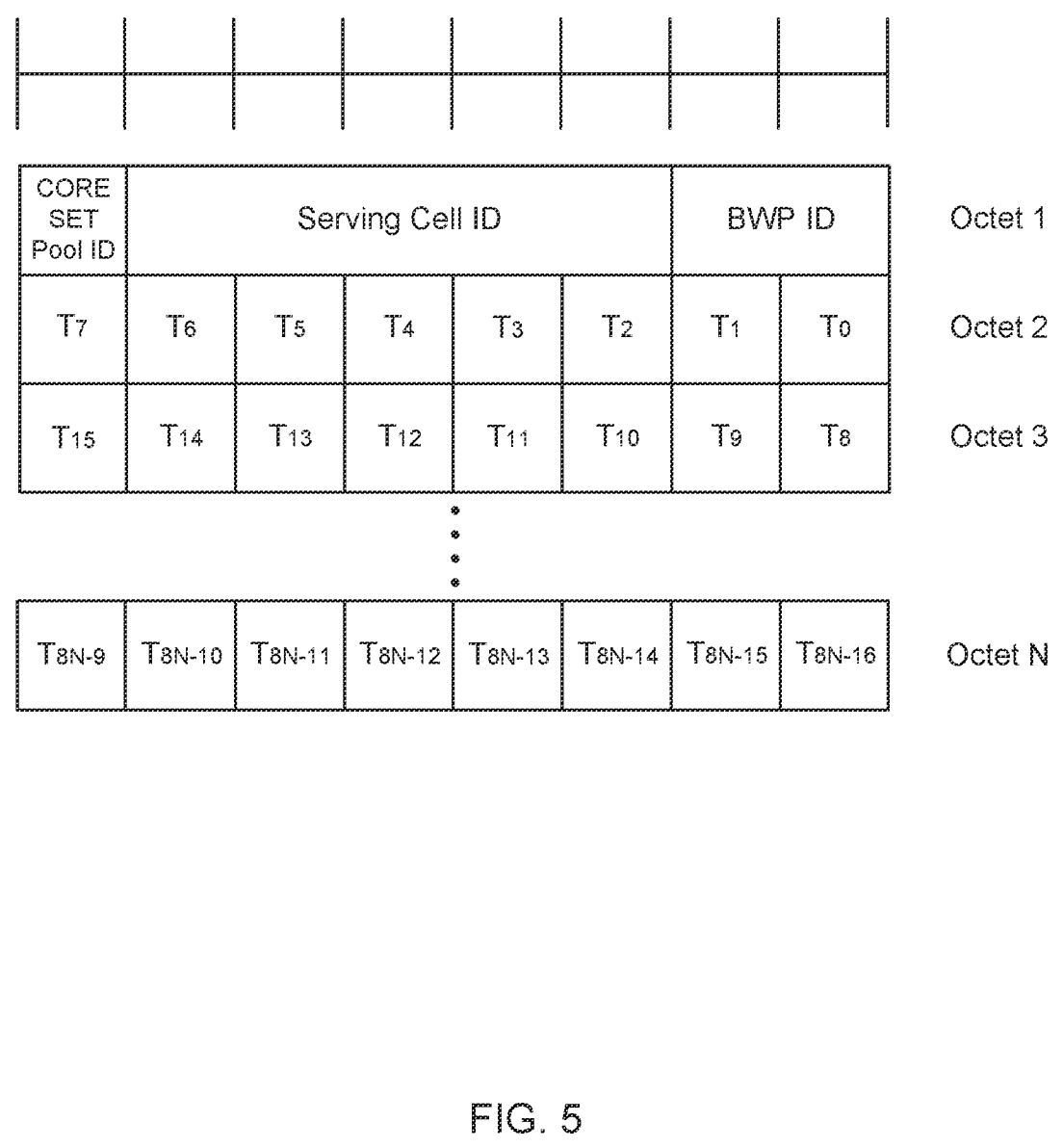

| Octet 1 | Octet 2 | Octet 3 | | Octet N |
|---|---|---|---|---|
| BWP ID | T0 | T8 | | T8N-16 |
| | T1 | T9 | | T8N-15 |
| Serving Cell ID | T2 | T10 | | T8N-14 |
| | T3 | T11 | ... | T8N-13 |
| | T4 | T12 | | T8N-12 |
| | T5 | T13 | | T8N-11 |
| | T6 | T14 | | T8N-10 |
| CORE SET Pool ID | T7 | T15 | | T8N-9 |

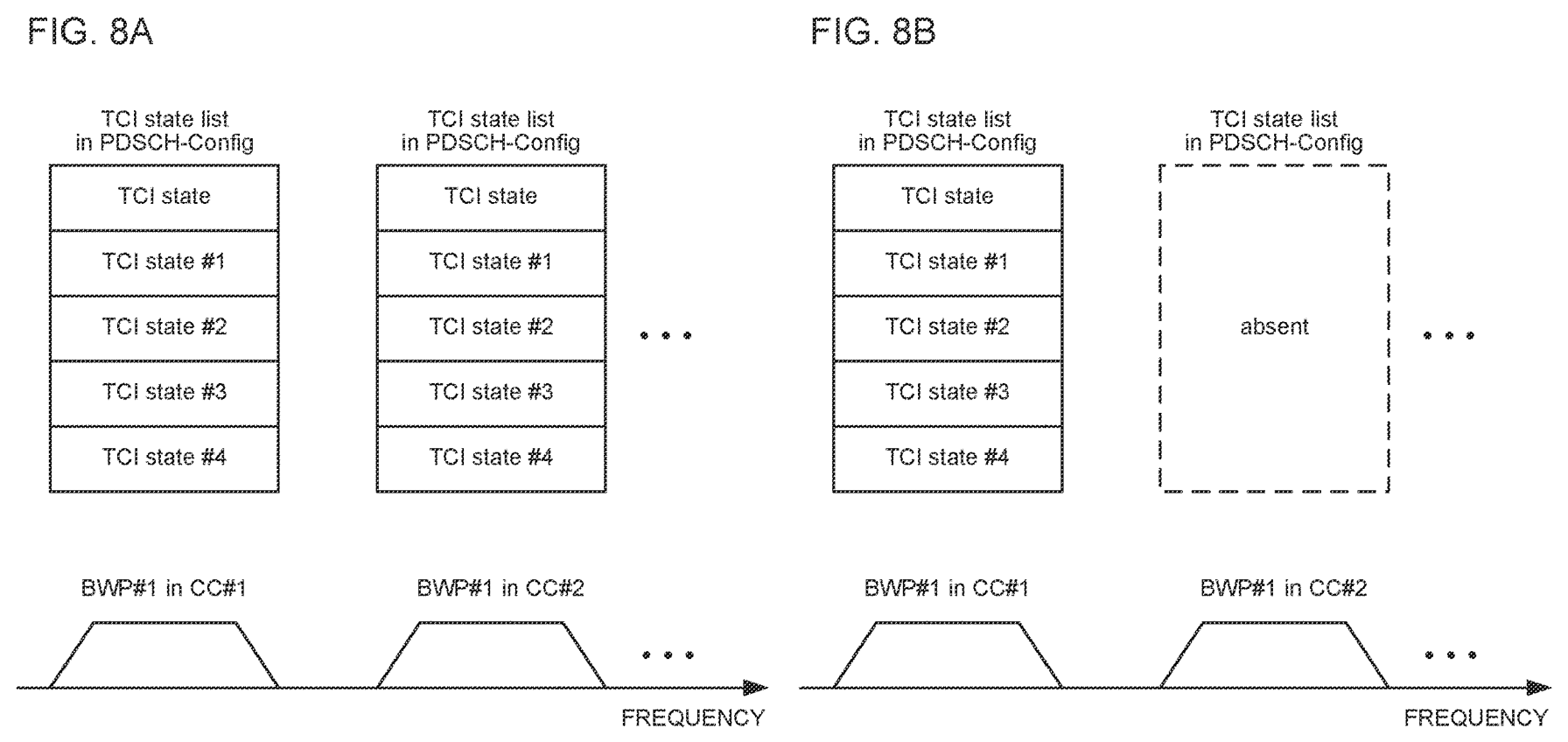

| TCI state list in PDSCH-Config |
| --- |
| TCI state |
| TCI state #1 |
| TCI state #2 |
| TCI state #3 |
| TCI state #4 |

...

| TCI state list in PDSCH-Config |
| --- |
| TCI state |
| TCI state #1 |
| TCI state #2 |
| TCI state #3 |
| TCI state #4 |

...

BWP#1 in CC#1    BWP#1 in CC#2    FREQUENCY

FIG. 8B

| TCI state list in PDSCH-Config |
| --- |
| TCI state |
| TCI state #1 |
| TCI state #2 |
| TCI state #3 |
| TCI state #4 |

...

| TCI state list in PDSCH-Config |
| --- |
| absent |

...

BWP#1 in CC#1    BWP#1 in CC#2    FREQUENCY

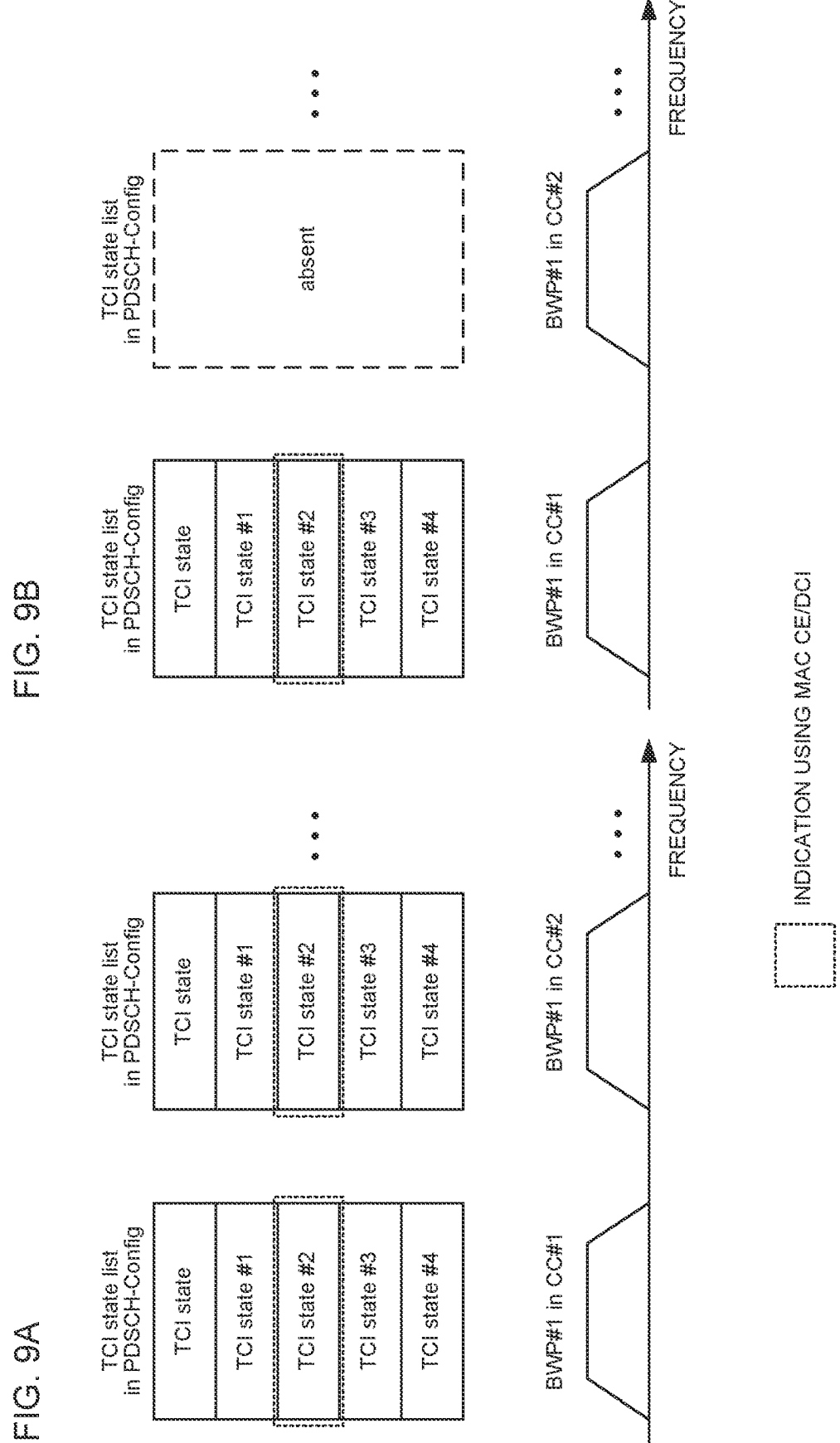

FIG. 10A qcl-Type1

| Field | value |
|---|---|
| Cell | - (absent) |
| bwp-id | - (absent) |
| referenceSignal | NZP CSI-RS #5 |
| qcl-Type | typeA | qcl-Type2

| Field | value |
|---|---|
| Cell | - (absent) |
| bwp-id | - (absent) |
| referenceSignal | NZP CSI-RS #5 |
| qcl-Type | typeD |

FIG. 10B qcl-Type1

| Field | value |
|---|---|
| Cell | - (absent) |
| bwp-id | - (absent) |
| referenceSignal | NZP CSI-RS #5 |
| qcl-Type | typeA | qcl-Type2

| Field | value |
|---|---|
| Cell | cell #2 |
| bwp-id | cell #2 |
| referenceSignal | NZP CSI-RS #5 |
| qcl-Type | typeD |

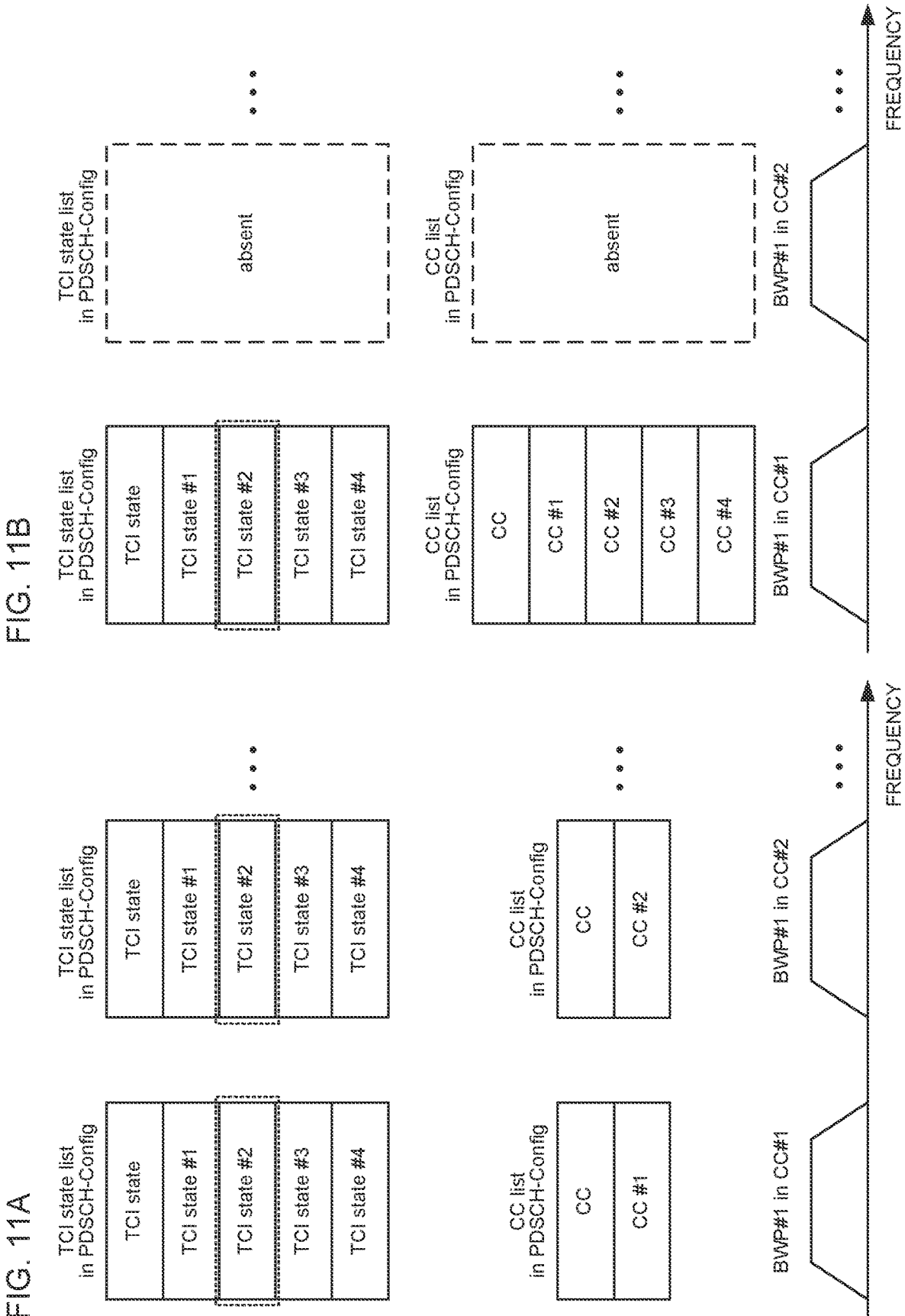

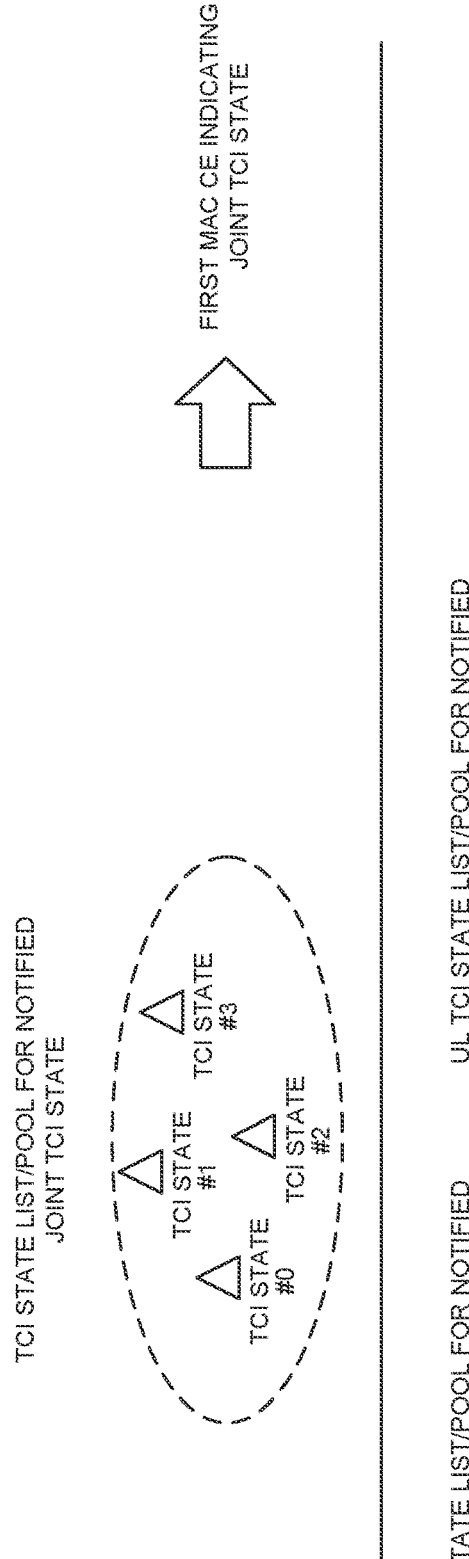
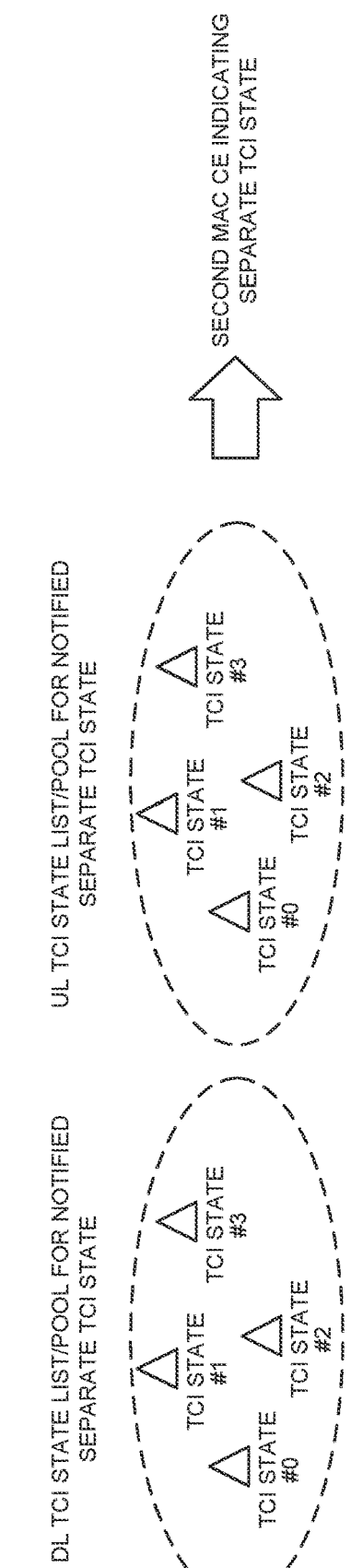
FIG. 12

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, specifications of Long Term Evolution (LTE) have been drafted for the purpose of further increasing data rates, providing low latency, and the like (Non Patent Literature 1). In addition, the specifications of LTE-Advanced (3GPP Rel. 10 to 14) have been drafted for the purpose of further increasing capacity and advancement of LTE (Third Generation Partnership Project (3GPP) releases (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In a future radio communication system (for example, NR), control by a user terminal (terminal, a user terminal, User Equipment (UE)) of transmission/reception processing on the basis of information (QCL assumption/Transmission Configuration Indication (TCI) state/spatial relation) regarding Quasi-Co-Location (QCL) is being studied.

Applying a configured/activated/indicated TCI state to a plurality of types of signals (channel/RS) is being studied. However, there are cases where the method of indicating the TCI state is not clear. If a method for indicating the TCI state is not clear, a decrease in communication quality, a decrease in throughput, or the like may be caused.

Therefore, an object of the present disclosure is to provide a terminal, a radio communication method, and a base station for appropriately issuing a TCI state command.

Solution to Problem

A terminal according to an aspect of the present disclosure includes: a receiving section that receives one or more first radio resource control (RRC) information elements relating to a list of transmission configuration indication (TCI) states including a plurality of TCI states applicable to a plurality of types of channels, and one or more second RRC information elements relating to a configuration of one or more serving cells or one or more bandwidth parts; and a control section that discriminates, in a case where the first RRC information element is not associated with a specific serving cell or a specific bandwidth part, one or more TCI states used for the specific serving cell or the specific bandwidth part, based on the first RRC information element and the second RRC information element, in which the receiving section receives a medium access control (MAC) control element indicating an activated serving cell or bandwidth part, among the one or more serving cells or the one or more bandwidth parts.

Advantageous Effects of Invention

According to one aspect of the present disclosure, a TCI state indication can be appropriately issued.

BRIEF DESCRIPTION OF DRAWINGS

FIGS. 2A and 2B are diagrams illustrating an example of a common beam.

FIG. 5 is a diagram illustrating an example of a MAC CE defined using Rel. 16.

FIGS. 8A and 8B are diagrams illustrating an example of a method for configuring a TCI state list according to a first embodiment.

FIGS. 9A and 9B are diagrams illustrating an example of a method for indicating a TCI state list according to the first embodiment.

FIGS. 10A and 10B are diagrams illustrating an example of a method for configuring QCL information according to the first embodiment.

FIGS. 11A and 11B are diagrams illustrating an example of a method for configuring a CC/BWP list according to a second embodiment.

FIG. 12 is a diagram illustrating an example of a TCI state indication according to a third embodiment.

FIGS. 14A and 14B are diagrams illustrating an example of a MAC CE field for CC/BWP list notification.

Figure 1:
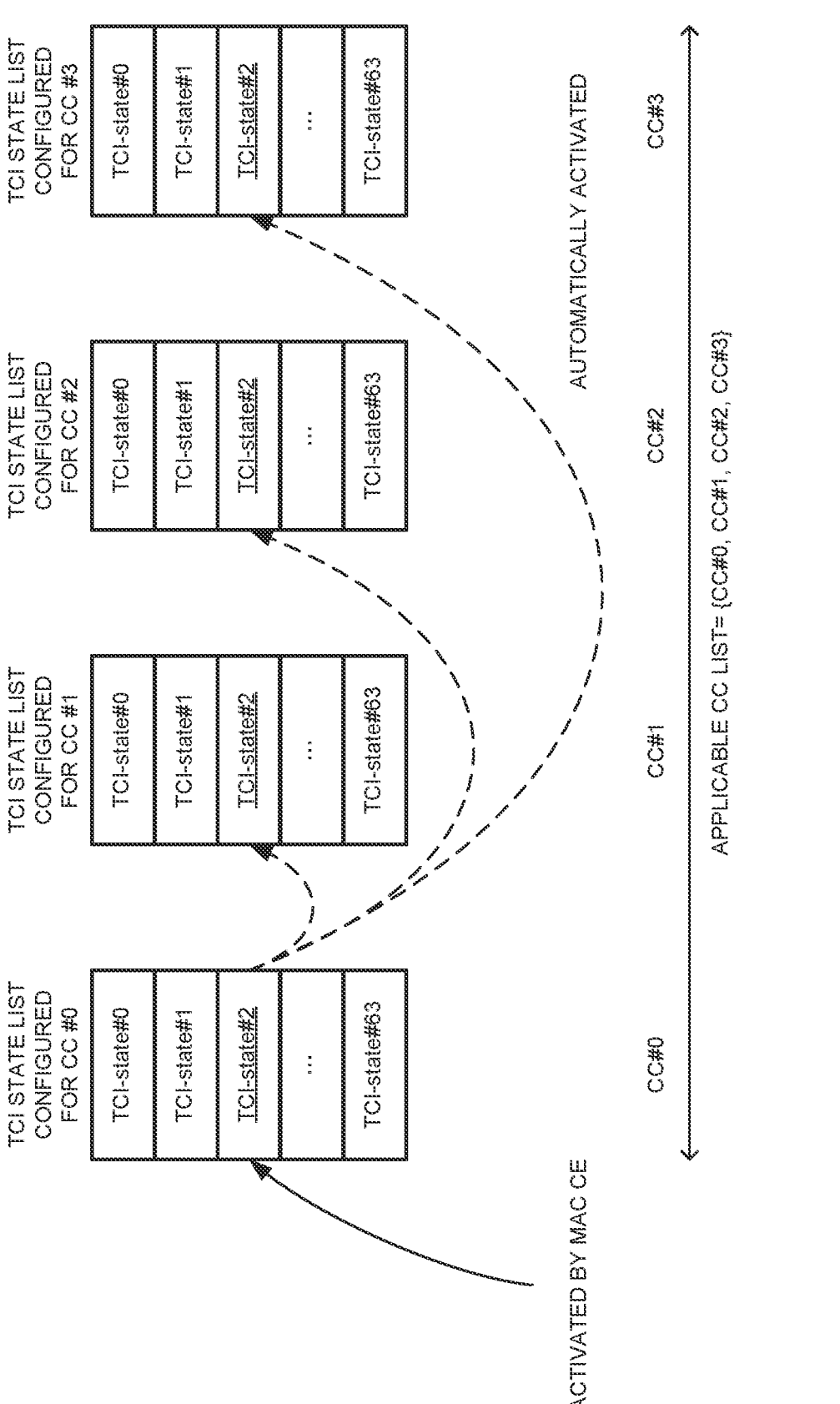
FIG. 1 is a diagram illustrating an example of simultaneous beam updating of a plurality of CCs.

DESCRIPTION OF EMBODIMENTS (TCI, Spatial Relation, and QCL)

In NR, controlling reception processing (for example, at least one of reception, demapping, demodulation, and decoding) and transmission processing (for example, at least one of transmission, mapping, precoding, modulation, and coding) in the UE of a signal and/or a channel (expressed as a signal/channel) on the basis of a transmission configuration indication state (TCI state) is being studied.

The TCI state may represent what is applied to a downlink signal/channel. A state corresponding to the TCI state applied to an uplink signal/channel may be expressed as a spatial relation.

The TCI state is information regarding a quasi-co-location (QCL) of the signal/channel, and may also be referred to as a spatial Rx parameter, spatial relation information, or the like. The TCI state may be configured in the UE for each channel or each signal.

The QCL is an indicator indicating a statistical property of a signal/channel. For example, this may mean that, when a certain signal/channel and another signal/channel have a QCL relation, it may be assumed that at least one of a Doppler shift, a Doppler spread, an average delay, a delay spread, and a spatial parameter (for example, a spatial Rx parameter) is the same (the QCL for at least one of the foregoing) for the plurality of different signals/channels.

Note that a spatial Rx parameter may correspond to a UE reception beam (for example, a reception analog beam), and the beam may be specified based on a spatial QCL. A QCL (or at least one element of the QCL) in the present disclosure is interchangeable with a spatial QCL (sQCL).

A plurality of types of QCL (QCL types) may be defined. For example, four QCL types A to D having different parameters (or parameter sets) that can be assumed to be identical may be provided, and these parameters (which may be referred to as QCL parameters) are as follows:

QCL type A (QCL-A): Doppler shift, Doppler spread, average delay, and delay spread;
QCL type B (QCL-B): Doppler shift and Doppler spread;
QCL type C (QCL-C): Doppler shift and average delay; and
QCL type D (QCL-D): spatial Rx parameter.

It may be referred to as a QCL assumption for the UE to assume that a certain control resource set (CORESET), channel, or reference signal has a specific QCL (for example, QCL type D) relation with another CORESET, channel, or reference signal.

The UE may also determine at least one of a Tx beam and a reception beam (Rx beam) of a signal/channel based on a TCI state of the signal/channel or the QCL assumption.

The TCI state may be, for example, information regarding the QCL of a target channel (in other words, a reference signal (RS) for the channel) and another signal (for example, another RS). The TCI state may be configured (indicated) by higher layer signaling, physical layer signaling, or a combination thereof.

The physical layer signaling may be, for example, Downlink Control Information (DCI).

A channel for which a TCI state or spatial relation is configured (specified) may be, for example, at least one of a Physical Downlink Shared Channel (PDSCH), a Physical Downlink Control Channel (PDCCH), a Physical Uplink Shared Channel (PUSCH), and a Physical Uplink Control Channel (PUCCH).

Furthermore, an RS having a QCL relation with the channel may be, for example, at least one of a Synchronization Signal Block (SSB), a Channel State Information Reference Signal (CSI-RS)), a measurement reference signal (Sounding Reference Signal (SRS)), a tracking CSI-RS (also referred to as a Tracking Reference Signal (TRS)), and a QCL detection reference signal (also referred to as a QRS).

The SSB is a signal block including at least one of a primary synchronization signal (PSS), a secondary synchronization signal (SSS), and a broadcast channel (physical broadcast channel (PBCH)). The SSB may be referred to as an SS/PBCH block.

An RS of QCL type X in a TCI state may mean an RS in a QCL type X relation with (DMRS of) a certain channel/signal, and this RS may be referred to as a QCL source of QCL type X in the TCI state.

A QCL type A RS is always configured for the PDCCH and the PDSCH, and a QCL type D RS may be additionally configured. Because it is difficult to estimate a Doppler shift, a delay, and the like by receiving a one-shot DMRS, a QCL type A RS is used to improve channel estimation accuracy. QCL type D RS is used in a reception beam determination upon receiving the DMRS.

For example, TRS 1-1, 1-2, 1-3, and 1-4 are transmitted, and TRS 1-1 is notified as a QCL type C/D RS according to the TCI state of the PDSCH. By being notified of the TCI state, the UE is capable of using the information obtained from the results of the past periodic reception/measurement of the TRS1-1 for reception/channel estimation of the PDSCH DMRS. In this case, the QCL source of the PDSCH is TRS1-1, and the QCL target is the PDSCH DMRS.

(Multi-TRPs)

In NR, one or more transmission/reception points (TRPs) (multi-TRPs (MTRPs)) performing DL transmission to the UE by using one or more panels (multi-panels) is being studied. Further, the UE performing UL transmission to one or more TRPs by using one or more panels is being studied.

Note that the plurality of TRPs may correspond to the same cell identifier (ID), or may correspond to different cell IDs. The cell ID may be a physical cell ID or a virtual cell ID.

The multiple TRPs (for example, TRPs #1 and #2) are connected by an ideal/non-ideal backhaul, and information, data, and the like may be exchanged. A different codeword (CW) and a different layer may be transmitted from each TRP of the multi-TRPs. Non-Coherent Joint Transmission (NCJT) may be used as one form of multi-TRP transmission.

In NCJT, for example, the TRP #1 performs modulation mapping and layer mapping on a first codeword, performs first precoding in a first number of layers (for example, two layers), and transmits a first PDSCH. In addition, the TRP #2 performs modulation mapping and layer mapping on a second codeword, performs second precoding in a second number of layers (for example, two layers), and transmits a second PDSCH.

Note that a plurality of PDSCHs (multiple PDSCH) subjected to NCJT may be defined as partially or completely overlapping with respect to a time domain and/or a frequency domain. That is, the first PDSCH from a first TRP and the second PDSCH from a second TRP may be overlapping relative to time resources and/or frequency resources.

The first PDSCH and the second PDSCH may be assumed not to be in a Quasi-Co-Location (QCL) relationship (not quasi-co-located). Multi-PDSCH reception is interchangeable with simultaneous reception of PDSCHs that are not of a certain QCL type (for example, QCL type D).

A plurality of PDSCHs (which may be referred to as multiple PDSCHs) from multiple TRPs may be scheduled by using one piece of DCI (single DCI, single PDCCH) (single master mode, single-DCI-based multi-TRP). The plurality of PDSCHs from the multi-TRP may be scheduled by using a plurality of pieces of DCI (multiple DCI or multiple PDCCHs) (multi-master mode, multi-DCI-based multi-TRP).

In URLLC for multi-TRP, support of PDSCH (transport block (TB) or codeword (CW)) repetition spanning multiple TRPs has been studied. Support for iterative procedures (URLLC schemes, for example, schemes 1, 2a, 2b, 3, 4) spanning multiple TRPs on a frequency domain, a layer (spatial) domain, or a time domain has been studied. In Scheme 1, multiple PDSCH from multiple TRPs undergo space division multiplexing (SDM). In Schemes 2a and 2b, PDSCH from multiple TRPs undergo frequency division multiplexing (FDM). In Scheme 2a, the redundancy version (RV) is the same for multiple TRPs. In Scheme 2b, the RVs may be the same or different for multiple TRPs. In Schemes 3 and 4, multiple PDSCH from multiple TRPs undergo time division multiplexing (TDM). In Scheme 3, multiple PDSCH from multiple TRPs are transmitted in one slot. In Scheme 4, multiple PDSCH from multiple TRPs are transmitted in different slots.

Such a multi-TRPs scenario enables more flexible transmission control to be performed using a high-quality channel.

In order to support intra-cell (having the same cell ID) and inter-cell (having different cell IDs) multi-TRP transmission based on a plurality of PDCCHs, in RRC configuration information for linking a plurality of PDCCH and PDSCH pairs having a plurality of TRPs, one control resource set (CORESET) in PDCCH configuration information (PDCCH-Config) may correspond to one TRP.

The UE may judge multi-DCI-based multi-TRP when at least one of the following conditions 1 and 2 is met: In this case, TRP is interchangeable with CORESET pool index.
[Condition 1]
A CORESET pool index of 1 is configured.
[Condition 2]
Two different values (for example, 0 and 1) of the CORESET pool index are configured.

The UE may judge single-DCI-based multi-TRP when the following condition is met: In this case, two TRPs are interchangeable with two TCI states indicated by MAC CE/DCI.
[Condition]
"Enhanced TCI state activation/deactivation MAC CE for UE-specific PDSCH (Enhanced TCI States Activation/De-activation for UE-specific PDSCH MAC CE)" is used to indicate one or two TCI states for one code point in the TCI field in the DCI.

A DCI for common beam indication may be a UE-specific DCI format (for example, DL DCI format (for example, 1_1 and 1_2), UL DCI format (for example, 0_1 and 0_2)) or a UE-group common DCI format.
(Simultaneous Beam Update of Plurality of CCs)

In Rel. 16, one MAC CE is capable of updating beam indexes (TCI states) of a plurality of CCs.

A UE may have up to two applicable CC lists (for example, applicable-CC-lists) configured by RRC. When the two applicable CC lists are configured, the two applicable CC lists may respectively correspond to intra-band CA in FR1 and intra-band CA in FR2.

The activation MAC CE of the TCI state of the PDCCH activates the TCI state associated with the same CORESET ID on all BWPs/CCs in the applicable CC list.

The activation MAC CE of the TCI state of the PDSCH activates the TCI state on all the BWPs/CCs in the applicable CC list.

The activation MAC CE of a spatial relation of A-SRS/SP-SRS activates the spatial relation associated with the same SRS resource ID on all BWPs/CCs in the applicable CC list.

In the example of FIG. 1, the UE is configured with an applicable CC list indicating CCs #0, #1, #2, and #3, and a list indicating 64 TCI states for the CORESET or PDSCH of each CC. If one TCI state for CC #0 is activated by the MAC CE, the corresponding TCI state is activated in CCs #1, #2, and #3.

Such simultaneous beam updating being applicable only to a single TRP case has been studied.

For the PDSCH, the UE may be based on the following procedure A.
[Procedure A]
The UE receives an activation command to map up to 8 TCI states to a code point of a DCI field (TCI field) within one CC/DL BWP or within one set of CCs/BWPs. When one set of TCI state IDs is activated for one set of CCs/DL BWPs, the applicable list of CCs is determined by the indicated CC in the activation command and the same set of TCI states is applied for all DL BWPs in the indicated CC. One set of TCI state IDs may be activated for one set of CCs/DL BWPs only when the UE is not provided with a plurality of different values of the CORESET pool index (CORESETPoolIndex) in the CORESET information element (ControlResourceSet) and not provided with at least one TCI code point mapped to two TCI states.

For the PDCCH, the UE may be based on the following procedure B.
[Procedure B]
When the UE is provided with a list of up to two cells for simultaneous TCI state activation with a simultaneous TCI update list (simultaneousTCI-UpdateList-r16 and/or simultaneousTCI-UpdateListSecond-r16) by a simultaneous TCI cell list (simultaneousTCI-CellList), the UE applies an antenna port quasi co-location (QCL), provided by the TCI state having the same activated TCI state ID value, to the CORESET with an index p in all configured DL BWPs of all configured cells in one list determined from a serving cell index provided by the MAC CE command. A simultaneous TCI cell list can be provided for simultaneous TCI state activation only when the UE is not provided with a plurality of different values of the CORESET pool index (CORE-SETPoolIndex) in the CORESET information element (ControlResourceSet) and not provided with at least one TCI code point mapped to two TCI states.

For semi-persistent (SP)/aperiodic (AP)-SRS, the UE may be based on the following procedure C.
[Procedure C]
For one set of CCs/BWPs, when spatial relation information (spatialRelationInfo) for an SP or AP-SRS resource configured by a SRS resource information element (higher layer parameter SRS-Resource) is activated/updated by the MAC CE, the applicable list of CCs is indicated by the simultaneous spatial update list (higher layer parameter simultaneousSpatial-UpdateList-r16 or simultaneousSpatial-UpdateListSecond-r16), and the spatial relation information is applied to the SP or AP-SRS resource having the same SRS resource ID in all BWPs in the indicated CC. Only when the UE is not provided with a plurality of different values of the CORESET pool index (CORESET-PoolIndex) in the CORESET information element (Control-ResourceSet) and is not provided with at least one TCI code point mapped to two TCI states, for one set of CCs/BWPs, the spatial relation information (spatialRelationInfo) for the SP or AP-SRS resources configured by the SRS resource information element (higher layer parameter SRS-Resource) is activated/updated by the MAC CE.

The simultaneous TCI cell list (simultaneousTCI-Cell-List) and simultaneous TCI update list (simultaneousTCI-UpdateList1-r16 and/or simultaneousTCI-UpdateList2-r16) are lists of serving cells for which the TCI relation can be simultaneously updated by using the MAC CE. Simultaneous TCI-UpdateList1-r16 and simultaneousTCI-UpdateList2-r16 do not include the same serving cell.

The simultaneous spatial update list (the higher layer parameters simultaneousSpatial-UpdatedList1-r16 and/or simultaneousSpatial-UpdatedList2-r16) is a list of serving cells for which the spatial relation can be simultaneously updated by using the MAC CE. SimultaneousSpatial-UpdatedList1-r16 and simultaneousSpatial-UpdatedList2-r16 do not include the same serving cells.

Here, the simultaneous TCI update list and the simultaneous spatial update list are configured by the RRC, a CORESET pool index of the CORESET is configured by the RRC, and a TCI code point mapped to the TCI state is indicated by the MAC CE.

(Unified/Common TCI Framework)

According to the unified TCI framework, UL and DL channels can be controlled by a common framework. The unified TCI framework may indicate a common beam (common TCI state) and apply same to all UL and DL channels, or a UL common beam may be applied to all UL channels, and a DL common beam may be applied to all DL channels, instead of defining a TCI state or a spatial relation for each channel as per Rel. 15.

One common beam for both DL and UL, or a DL common beam and a UL common beam (two common beams in total) has been considered.

The UE may assume the same TCI state (joint TCI state, joint TCI pool, joint common TCI pool, joint TCI state set) for UL and DL. The UE may assume different TCI states (separate TCI state, separate TCI pool, UL separate TCI pool and DL separate TCI pool, separate common TCI pool, UL common TCI pool, and DL common TCI pool) for UL and DL, respectively.

The UL and DL default beams may be aligned by MAC CE-based beam management (MAC CE level beam indication). The default TCI state of the PDSCH may be updated to match the default UL beam (spatial relation).

DCI-based beam management (DCI level beam indication) may indicate the common beam/unified TCI state from the same TCI pool (joint common TCI pool, joint TCI pool, set) for both UL and DL. X (>1) TCI states may be activated by the MAC CE. The UL/DL DCI may select one from among X active TCI states. The selected TCI state may also be applied to both UL and DL channels/RS.

The TCI pool (set) may be a plurality of TCI states configured using an RRC parameter, or may be a plurality of TCI states (active TCI states, active TCI pool, set) activated by the MAC CE among the plurality of TCI states configured using the RRC parameter. Each TCI state may be a QCL type A/D RS. The SSB, the CSI-RS, or the SRS may be configured as the QCL type A/D RS.

The number of TCI states corresponding to each of one or more TRPs may be defined. For example, the number $N$ ($\geq 1$) of TCI states (UL TCI states) applied to the UL channel/RS and the number $M$ ($\geq 1$) of TCI states (DL TCI states) applied to the DL channel/RS may be defined. N and/or M may be notified/configured/indicated to the UE via higher layer signaling/physical layer signaling.

In the present disclosure, the notation N=M=X (X is any integer) may mean that the UE is notified/configured/instructed regarding a TCI state (joint TCI state) common to X (corresponding to X TRPs) UL and DL. In addition, in a case where N=X (X is any integer) and M=Y (Y may be any integer, Y=X) are described, same may mean that X (corresponding to X TRPs) UL TCI states and Y (corresponding to Y TRPs) DL TCI states (that is, separate TCI states) are respectively notified/configured/indicated to the UE.

For example, the notation N=M=1 may mean that a TCI state common to one UL and DL for a single TRP is notified/configured/indicated to the UE (joint TCI state for a single TRP).

In addition, for example, the notations N=1 and M=1 may mean that one UL TCI state and one DL TCI state for a single TRP are separately notified/configured/indicated to the UE (separate TCI state for a single TRP).

Furthermore, for example, the notation N=M=2 may mean that a TCI state common to a plurality of (two) UL and DL for a plurality of (two) TRPs is notified/configured/indicated to the UE (joint TCI state for a plurality of TRPs).

In addition, for example, the notations N=2 and M=2 may mean that a plurality of (two) UL TCI states and a plurality of (two) DL TCI states for a plurality of (two) TRPs are notified/configured/indicated to the UE (separate TCI states for a plurality of TRPs).

Note that, in the above example, the case where the values of N and M are 1 or 2 has been described, but the values of N and M may be 3 or more, and N and M may be different.

In the example of FIG. 2A, the RRC parameter (information element) configures a plurality of TCI states for both DL and UL. The MAC CE may activate a plurality of TCI states among the plurality of configured TCI states. The DCI may indicate one of the plurality of activated TCI states. The DCI may be UL/DL DCI. The indicated TCI state may also be applied to at least one (or both) of the UL/DL channels/RS. One DCI may indicate both UL TCI and DL TCI.

In the example of FIG. 2A, one point may be one TCI state applied to both UL and DL, or two TCI states applied to UL and DL, respectively.

The plurality of TCI states configured by the RRC parameter and/or the plurality of TCI states activated by the MAC CE may be referred to as a TCI pool (common TCI pool, joint TCI pool, TCI state pool). The plurality of TCI states activated by the MAC CE may be referred to as an active TCI pool (active common TCI pool).

Note that, in the present disclosure, higher layer parameters (RRC parameters) for configuring a plurality of TCI states may be referred to as configuration information for configuring a plurality of TCI states, and may be simply referred to as "configuration information". In addition, in the present disclosure, the indication of one of the plurality of TCI states by using the DCI may involve receiving indication information indicating one of the plurality of TCI states included in the DCI, or may involve simply receiving "indication information".

In the example of FIG. 2B, the RRC parameter configures a plurality of TCI states (joint common TCI pool) for both DL and UL. The MAC CE may activate a plurality of TCI states (active TCI pool) among the plurality of configured TCI states. Active TCI pools (each separate) for the respective UL and DL may be configured/activated.

DL DCI or a new DCI format may select (indicate) one or more (for example, one) TCI states. The selected TCI state may also be applied to one or more (or both) DL channels/RS. The DL channel may be PDCCH/PDSCH/CSI-RS. The UE may determine the TCI states of each DL channel/RS by using a Rel. 16 TCI state operation (TCI framework). UL DCI or a new DCI format may select (indicate) one or more (for example, one) TCI states. The selected TCI state may also be applied to one or more (or both) UL channels/RS. The UL channel may be a PUSCH/SRS/PUCCH. In this way, different DCIs may separately indicate UL TCI and DL DCI.

The existing DCI format 1_1/1_2 may be used to indicate a common TCI state.

The common TCI framework may have separate TCI states for DL and UL.

(Unified TCI Framework in Carrier Aggregation (CA))

Introducing a unified TCI state framework in CA has been studied in NR since Rel. 17. The common TCI state indicated to the UE is expected to be common among CCs (cells) (at least QCL type D among CCs). This is because simultaneous reception of different DL channels/RS of QCL type D and simultaneous transmission of UL channels/RS having different spatial relations are not supported in the existing specification (Rel. 15/16) except for cases of transmission and reception using a plurality of TRPs.

In addition, in a unified TCI framework, updating/activation of a common TCI state ID for the provision of common QCL information/a common UL transmission space filter spanning a configured set of multiple CCs has been studied.

As a TCI state pool for CA, the following Options 1 and 2 are being studied.

[Option 1]

A single TCI state pool configured by RRC for a configured set of multiple CCs (cells)/BWPs may be shared (configured). For example, the cell group TCI state may be defined, or the TCI state pool for PDSCH in the reference cell may be reused. In the TCI state, there is no CC (cell) ID for the QCL type A RS, and the CC (cell) ID for the QCL type A RS may be determined according to the target CC (cell) in the TCI state.

In Option 1, because the common TCI state pool is configured for each of the plurality of CCs/BWPs, when one common TCI state is indicated by the MAC CE/DCI, the indicated common TCI state may be applied to all CCs/ BWPs (all CCs/BWPs included in the preconfigured CC/BWP list).

[Option 2]

A TCI state pool may be configured by RRC for each individual CC.

In Option 2, similarly to Rel. 16, when an applied CC/BWP list of simultaneous beam updates is preconfigured by RRC, and the beam updates are performed by MAC CE/DCI in any CC/BWP included in the CC/BWP list, the updates may be applied to all CCs/BWPs.

In Option 1, a common TCI state pool is configured (shared) by RRC for a plurality of CCs, TCI states in the common TCI state pool are indicated by a common TCI state ID, and one RS determined based on the TCI states will be used to indicate QCL type D spanning the configured set of/multiple CCs/(constraint 1).

In Option 2, a common TCI state pool is configured by RRC individually for each CC, TCI states in the common state pool are indicated by a common TCI state ID, and one RS determined based on the TCI states will be used to indicate QCL type D spanning the configured set of multiple CCs/(constraint 2).

(Constraint on QCL Configuration)

As described above, controlling beams of a plurality of types of channels using a common TCI framework and using a common beam indication/activation (MAC CE/DCI) has been studied; however, this control is performed on one CC (cell).

A simultaneous beam update spanning a plurality of CCs as specified in Rel. 16 is capable of updating beams of a plurality of BWPs/CCs by using one MAC CE beam indication, thereby reducing beam control overhead.

In Rel. 15/16, QCL source RS (type A RS and type D RS) configured using the TCI state of a PDCCH DMRS/PDSCH DMRS (which, in the present disclosure, may simply be referred to as DMRS) are limited to the following cases (Case 1) to (Case 3):

(Case 1) A type A RS is a tracking reference signal (TRS) (CSI-RS for which higher layer parameter trs-Info is configured), and a type D RS is a CSI-RS equal to the type A RS.

(Case 2) The type A RS is a TRS, and the type D RS is a CSI-RS for which higher layer parameter repetition is configured.

(Case 3) The type A RS is a CSI-RS for which the higher layer parameter trs-Info is not configured and the higher layer parameter repetition is not configured, and the type D RS is a CSI-RS equal to the type A RS.

Therefore, the type A RS and the type D RS are different CSI-RS resources only in the foregoing case (Case 2).

In addition, the CSI-RS for which the higher layer parameter repetition is configured may be configured to assist UE reception beam determination. However, the UE reception beam determination can be performed without using the CSI-RS for which the higher layer parameter repetition is configured.

Meanwhile, because the network (NW, for example, the base station) transmits the TRS as the type A RS, the operation in the foregoing case (Case 1), in which the TRS is used as the type D RS, is considered to be typical.

Even in a common TCI framework, it is preferable to enable simultaneous beam updates spanning a plurality of CCs. However, the QCL configuration between the PDCCH DMRS/PDSCH DMRS and the TRS in a plurality of CCs is subject to the following constraints.

Figure 3:
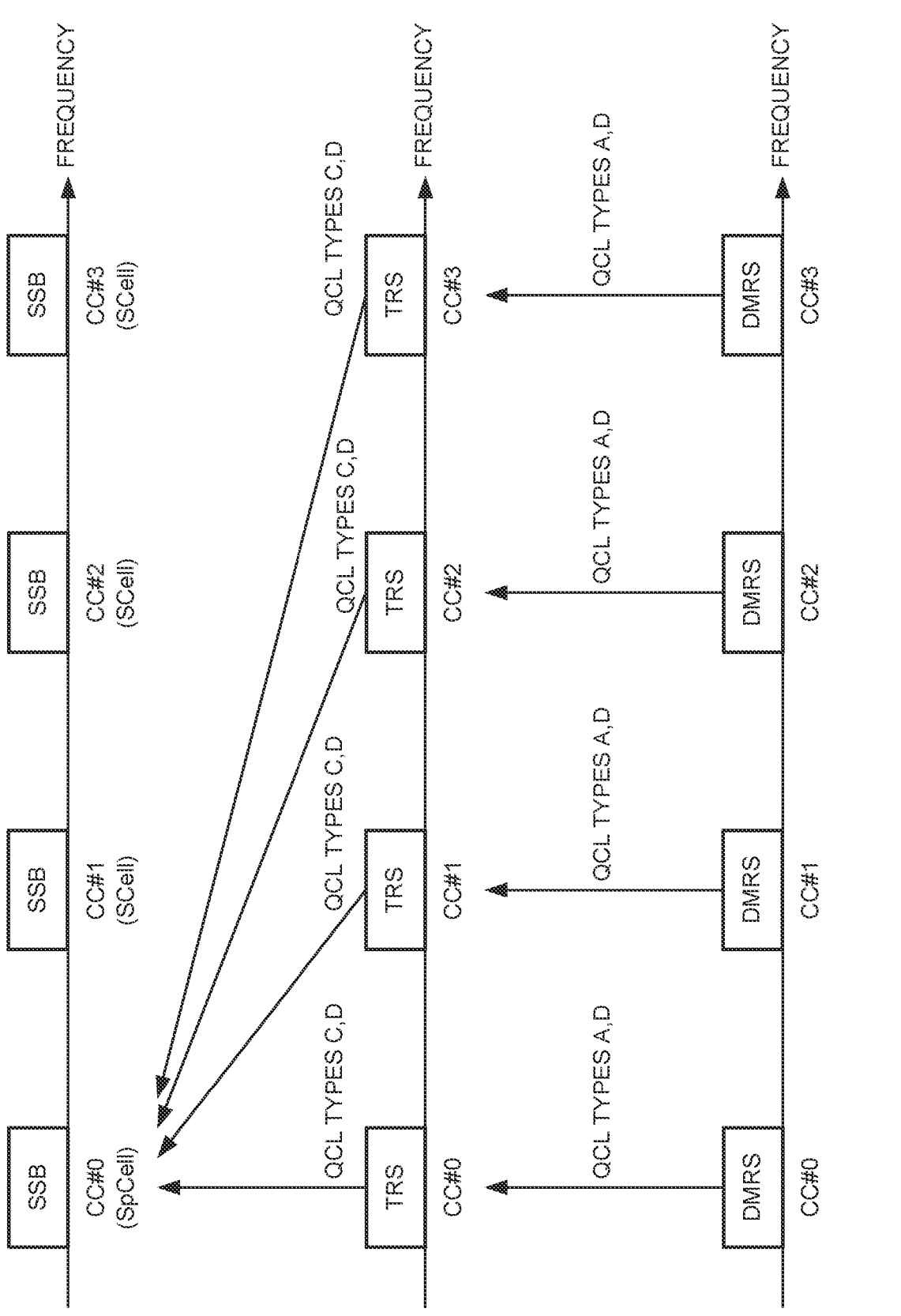
FIG. 3 is a diagram illustrating an example of a configurable QCL configuration.

For example, configuration as illustrated in FIG. 3 is possible. It is assumed that CC #0, which is a special cell (SpCell) (primary cell (PCell), or primary secondary cell (PSCell)) and #1, #2, and #3, which are SCells, are configured, and SSB, TRS, DMRS for PDCCH/DMRS for PDSCH (which may be simply referred to as DMRS) are transmitted in each CC. In this case, the TRS of each CC is in a QCL type C and D relationship with the SSB of CC #0, and the PDCCH of each CC is in a QCL type A and D relationship with the TRS of the same CC.

Figure 4:
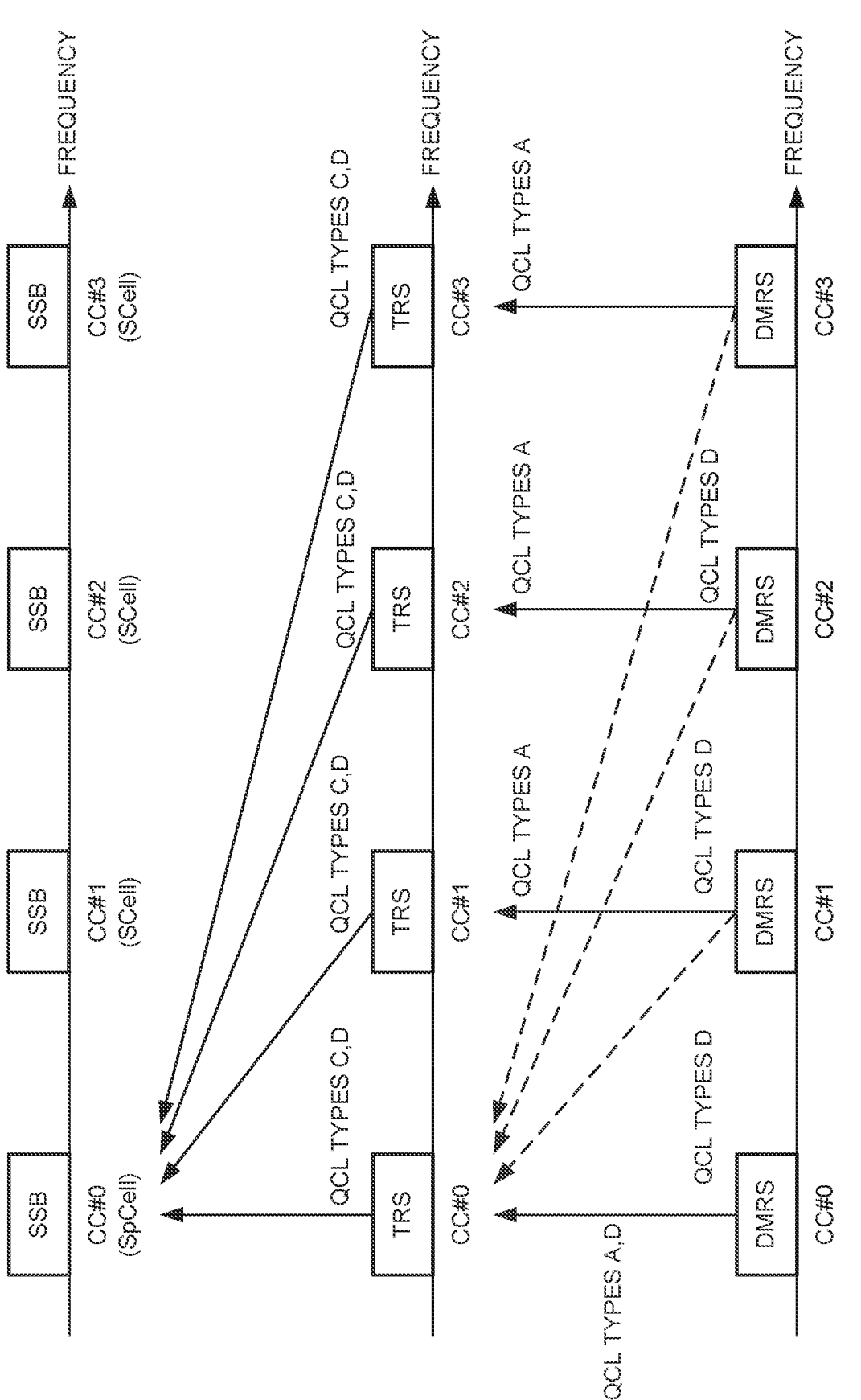
FIG. 4 is a diagram illustrating an example of a non-configurable QCL configuration.

For example, the configuration as illustrated in FIG. 4 is impossible. Similar to FIG. 3 above, in a case where the TRS of each CC is in a QCL type C and D relationship with the SSB of CC #0, and the DMRS of each CC is in a QCL type A relationship with the TRS of the same CC, then the DMRS of CC #1, 2, 3 cannot be in a QCL type D relationship with the TRS of CC #0 (indicated using dashed lines). When the TCI state of the PDCCH DMRS/PDSCH DMRS is TRS, the RS of QCL type A and the RS of QCL type D need to be the same TRS.

In a case where the TRS is configured as the QCL type A/D RS in the TCI state of a certain CC, the TRS of another CC cannot be configured as the QCL type A/D RS. Therefore, even in a case where the common TCI pool or the common TCI is configured/updated/indicated between a plurality of CCs, configuration of the TCI state (the TCI state including the QCL type A/D RS) is performed for each CC.

In a case where a CSI-RS is configured as a QCL type D RS in a TCI state of one CC, a CSI-RS of another CC may be configurable as a QCL type D RS in a TCI state of a PDCCH/PDSCH of one CC. Also in this case, it is necessary to configure the CSI-RS/TRS of the same CC as the QCL type A RS in the TCI state. This is because QCL type A RS indicates that parameters that determine channel identification, such as delay spread and average delay, are the same, and therefore the values of these parameters may be different in different CCs.

A cell of a QCL type A RS needs to be the same as a cell of a PDSCH/PDCCH DMRS in which a TCI state is configured.

As described above, when the QCL type D RS is a TRS, the QCL type D RS needs to be the same as the QCL type A RS. In combination with the above description, when the QCL type D RS is a TRS, a cell of the QCL type D RS needs to be the same as a cell of a PDSCH/PDCCH DMRS for which the TCI state is configured.

When the QCL type D RS is a repeatedly configured CSI-RS (having a CSI-RS resource in an NZP CSI-RS resource set for which higher layer parameter repetition is configured (higher layer parameter repetition is ON)), a cell of the QCL type D RS may be different from a cell of a PDSCH/PDCCH DMRS for which a TCI state is configured.

(MAC CE)

In Rel. 16, a MAC CE (TCI States Activation/Deactivation for UE-specific PDSCH MAC CE) is used for activation/deactivation of the TCI state of the UE-specific PDSCH (see FIG. 5).

The MAC CE is identified by a MAC subheader having a Logical Channel ID (LCID).

The MAC CE may be used in an environment using a single TRP or a multi-DCI-based multi-TRP.

The MAC CE may include a serving cell ID field, a BWP ID field, a field ($T_i$) for indicating activation/deactivation of the TCI state, and a CORESET pool ID field.

The serving cell ID field may be a field for indicating a serving cell to which the MAC CE is applied. The BWP ID field may be a field for indicating a DL BWP to which the MAC CE is applied. The CORESET pool ID field may be a field indicating that the correspondence (mapping) between the activated TCI state and the code point (DCI TCI code point) of the TCI field indicated by the DCI set in the field $T_i$ is specific to the ControlResourceSetId configured using the CORESET pool ID.

Figure 6:
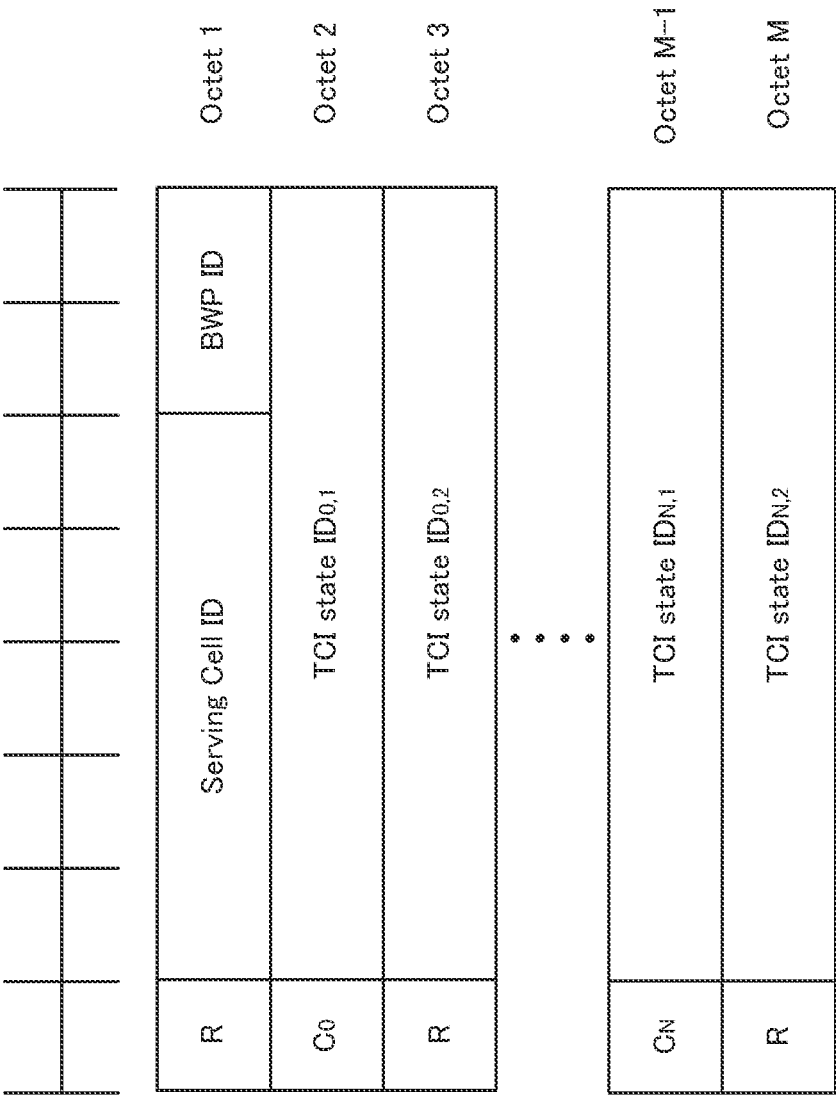
FIG. 6 is a diagram illustrating another example of a MAC CE defined using Rel. 16.

Further, in Rel. 16, a MAC CE (Enhanced TCI States Activation/Deactivation for UE-specific PDSCH MAC CE) is used for activation/deactivation of the TCI state of the UE-specific PDSCH (see FIG. 6).

The MAC CE is identified by a MAC PDU subheader having an eLCID.

The MAC CE may be used in an environment using a single-DCI-based multi-TRP.

The MAC CE may include: a serving cell ID field, a BWP ID field, a field (TCI state ID$_{i,j}$ (i is an integer from 0 to N, and j is 1 or 2.)) for indicating a TCI state identified by a TCI-State ID; a field ($C_i$) indicating whether or not the TCI state ID$_{i,2}$ exists in a corresponding octet, and a reserved bit field (R, set to 0).

"i" may correspond to an index of a code point in a TCI field indicated by the DCI. "TCI state ID$_{i,j}$" may indicate the jth TCI state of the code point of the ith TCI state field.

Figure 7:
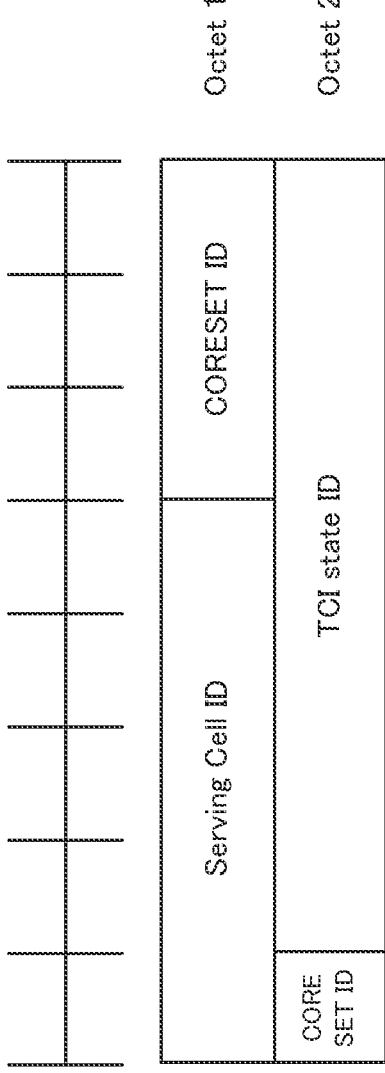
FIG. 7 is a diagram illustrating another example of a MAC CE defined using Rel. 16.

Further, in Rel. 16, a MAC CE (TCI State Indication for UE-specific PDCCH MAC CE) is used for activation/deactivation of the TCI state of the UE-specific PDCCH/CORESET (see FIG. 7).

The MAC CE is identified by a MAC subheader having an LCID.

The MAC CE may include a serving cell ID field, a field indicating a CORESET (CORESET ID) indicating a TCI state, and a field (TCI state ID) indicating a TCI state applicable to the CORESET identified by the CORESET ID.

Analysis

Incidentally, in the unified TCI state framework in CA in Rel. 17 and subsequent releases, regarding the QCL type D RS as an RS of a target CC (cell) or other CCs (cells) has been studied.

In the present disclosure, target CC/cell may mean a CC/cell to which a TCI state (for example, a TCI state of DMRS for PDSCH/PDCCH) is to be applied.

In the unified TCI state framework in CA in Rel. 17 and subsequent releases, re-usage of QCL rules defined in Rel. 15 has been studied.

More specifically, in the unified TCI state framework in CA in Rel. 17 and subsequent releases, the QCL type D RS may be the RS of the target CC (cell) or other indicated CCs (cells).

In addition, a CC-common QCL type D RS and a CC-specific QCL type D RS may be configurable. When a CC-specific QCL type D RS is configured, the QCL type D RS for each CC may be related to a CC-common QCL type D RS. This may mean that the CC-common SSB is configured as a QCL type D RS.

Further, a set of a plurality of CCs/BWPs may be configured as per the simultaneous beam update of a plurality of CCs defined in Rel. 16. A set of a plurality of CCs/BWPs may be referred to as a CC list, a BWP list, or a CC/BWP list.

Furthermore, in the unified TCI state framework in CA in Rel. 17 and subsequent releases, allowing the QCL constraint cases 1 to 3 as described above has been studied.

Furthermore, in Rel. 17 and subsequent releases, studies have been undertaken regarding configuring TCI state pools configured by RRC (RRC configured TCI state pool(s)) for each BWP/CC, or configuring a plurality of BWPs/CCs (in units of a plurality of BWPs/CCs).

In a case where the TCI state pool configured by RRC is configured for each BWP/CC, the TCI state pool configured by RRC may be configured in the PDSCH configuration (RRC information element "PDSCH-Config") for each BWP/CC, similarly to Rel. 15.

In a case where the TCI state pool configured by RRC is configured for each of a plurality of BWPs/CCs (in units), the TCI state pool configured by RRC may not exist in (may be absent from) the PDSCH configuration (RRC information element "PDSCH-Config") of each BWP/CC, and the TCI state pool configured by the RRC may be configured by referring to the TCI state pool configured by RRC in a certain reference BWP/CC.

For example, when the TCI state pool configured by RRC is configured in two CC units which are CC #1 and CC #2, it is conceivable that the TCI state is configured in the PDSCH configuration of CC #1, and that the TCI state is not configured in the PDSCH configuration of CC #2. The reference CC at this time is CC #1.

However, studies have been insufficient regarding a specific TCI state configuration method and a method of notifying a plurality of BWP/CC sets in a unified TCI state framework. If this study is not sufficient, the TCI state indication cannot be appropriately performed, and communication quality, throughput, and the like may deteriorate.

Therefore, the present inventors have conceived of a TCI state configuration method and a method of notifying a plurality of BWP/CC sets when configuring/indicating unified/common TCI.

Hereinafter, embodiments according to the present disclosure will be described in detail with reference to the drawings. The radio communication methods according to the embodiments may each be applied alone or in combination.

In the present disclosure, "A/B/C" and "at least one of A, B and C" are interchangeable. In the present disclosure, cell, serving cell, CC, carrier, BWP, DL BWP, UL BWP, active DL BWP, active UL BWP, and band are interchangeable. In the present disclosure, index, ID, indicator, and resource ID are interchangeable. In the present disclosure, "support", "control", "controllable", "operate", and "operable" are interchangeable.

In the present disclosure, "configure", "activate", "update", "indicate", "enable", "specify", and "select" are interchangeable.

In the present disclosure, the higher layer signaling may be any of, for example, Radio Resource Control (RRC) signaling, Medium Access Control (MAC) signaling, broadcast information, and the like, or a combination thereof. In the present disclosure, RRC, RRC signaling, RRC parameters, higher layer, higher layer parameters, RRC information elements (IE), and RRC message are interchangeable.

For example, a MAC Control Element (MAC CE), a MAC Protocol Data Unit (PDU), or the like may be used for the MAC signaling. The broadcast information may be, for example, a Master Information Block (MIB), a System Information Block (SIB), Remaining Minimum System Information (RMSI), Other System Information (OSI), or the like.

In the present disclosure, MAC CE and activation/deactivation command are interchangeable.

In the present disclosure, pool, set, group, list, and candidate are interchangeable.

In the present disclosure, DMRS, DMRS port, and antenna port are interchangeable.

In the present disclosure, special cell, SpCell, PCell, and PSCell are interchangeable.

In the present disclosure, beam, spatial domain filter, spatial setting, TCI state, UL TCI state, unified TCI state, unified beam, common TCI state, common beam, TCI assumption, QCL assumption, QCL parameter, spatial domain receive filter, UE spatial domain receive filter, UE reception beam, DL beam, DL reception beam, DL precoding, DL precoder, DL-RS, QCL type D RS of TCI state/QCL assumption, QCL type A RS of TCI state/QCL assumption, spatial relation, spatial domain transmit filter, UE spatial domain transmit filter, UE Tx beam, UL beam, UL Tx beam, UL precoding, UL precoder, and PL-RS are interchangeable. In the present disclosure, QCL type X-RS, DL-RS associated with QCL type X, DL-RS with QCL type X, DL-RS source, SSB, CSI-RS, and SRS are interchangeable.

In the present disclosure, common beam, common TCI, common TCI state, unified TCI, unified TCI state, TCI state applicable to DL and UL, TCI state applicable to a plurality (a plurality of types) of channels/RS, TCI state applicable to a plurality of types of channels/RS, and PL-RS are interchangeable.

In the present disclosure, a plurality of TCI states configured by the RRC, a plurality of TCI states activated by the MAC CE, pool, TCI state pool, active TCI state pool, common TCI state pool, joint TCI state pool, separate TCI state pool, common UL TCI state pool, common DL TCI state pool, common TCI state pool configured/activated by the RRC/MAC CE, and TCI state information are interchangeable.

In the present disclosure, a panel, an Uplink (UL) transmission entity, a TRP, spatial relation, a control resource set (COntrol REsource SET (CORESET), a PDSCH, a codeword, a base station, an antenna port (for example, a DeModulation Reference Signal (DMRS) port) of a signal, an antenna port group (for example, a DMRS port group) of a signal, a group for multiplexing (for example, a Code Division Multiplexing (CDM) group, a reference signal group, and a CORESET group), a CORESET pool, a CORESET subset, a CW, a redundancy version (RV), and a layer (MIMO layer, transmission layer, and spatial layer) are interchangeable. Further, panel identifier (ID) and panel are interchangeable. In the present disclosure, TRP ID, TRP-related ID, CORESET pool index, location (ordinal number, first TCI state or second TCI state) of one TCI state among two TCI states corresponding to one code point of a field in the DCI, and TRP are interchangeable.

In the present disclosure, TRP, transmission point, panel, DMRS port group, CORESET pool, one of two TCI states associated with one code point of a TCI field are interchangeable.

In the present disclosure, single TRP, single TRP system, single TRP transmission, and single PDSCH are interchangeable. In the present disclosure, multi-TRP, multi-TRP system, multi-TRP transmission, and multiple PDSCH are interchangeable. In the present disclosure, single DCI, single PDCCH, single-DCI-based multi-TRP, and two TCI states on at least one TCI code point being activated are interchangeable.

In the present disclosure, the fact that a single TRP, a channel using the single TRP, a channel using one TCI state/spatial relation, or a multi-TRP is not enabled by RRC/DCI, that a plurality of TCI states/spatial relations are not enabled by RRC/DCI, and that one CORESET pool index (CORESETPoolIndex) value is not configured for any CORESET, and that no code point in the TCI field is mapped to two TCI states are interchangeable.

In the present disclosure, the fact that a multi-TRP, a channel using the multi-TRP, a channel using a plurality of TCI states/spatial relations, or a multi-TRP is enabled by RRC/DCI, that a plurality of TCI states/spatial relations are enabled by RRC/DCI, and that a single DCI-based multi-TRP and a multi-DCI-based multi-TRP are interchangeable. In the present disclosure, configuration of a multi-DCI-based multi-TRP and of one CORESET pool index (CORESETPoolIndex) value for a CORESET are interchangeable. In the present disclosure, mapping of a single DCI-based multi-TRP and of at least one code point of a TCI field to two TCI states are interchangeable.

In the present disclosure, TRP #1 (first TRP) may correspond to CORESET pool index=0, or may correspond to a first TCI state among two TCI states corresponding to one code point of a TCI field. In the present disclosure, TRP #2 (second TRP) may correspond to CORESET pool index=1, or may correspond to a second TCI state among two TCI states corresponding to one code point of a TCI field.

In the present disclosure, cell, serving cell, CC, BWP, BWP in CC, and band are interchangeable.

In the present disclosure, "parameter X is not configured", "parameter X does not exist", "parameter X is absent", "parameter X is not configured as valid", and "parameter X is configured as invalid", and the like are interchangeable.

(Radio Communication Method)

In the present disclosure, DL TCI, DL only TCI, separate DL only TCI, DL common TCI, DL unified TCI, common TCI, and unified TCI are interchangeable. In the present disclosure, UL TCI, UL only TCI, separate UL only TCI, UL common TCI, UL unified TCI, common TCI, and unified TCI are interchangeable.

In the present disclosure, configuring/indicating/updating a separate TCI state, configuring/indicating a DL only TCI state, configuring/indicating/updating a UL only TCI state, and configuring/indicating/updating DL and UL TCI states are interchangeable.

In the present disclosure, a joint TCI pool case and a case where a joint TCI pool is configured are interchangeable. In the present disclosure, a separate TCI pool case and a case where a separate TCI pool is configured are interchangeable.

In the present disclosure, a case where a joint TCI pool is configured, a case where a TCI pool configured for DL and a TCI pool configured for UL are shared, a case where a TCI pool for both DL and UL is configured, and a case where one TCI pool (one set of TCI) is configured are interchangeable.

In the present disclosure, a case where a separate TCI pool is configured, a case where a TCI pool configured for DL and a TCI pool configured for UL are different, a case where a DL TCI pool (first TCI pool, first TCI set) and a UL TCI pool (second TCI pool, second TCI set) are configured, a case where a plurality of TCI pools (a plurality of sets of TCI) are configured, and a case where a DL TCI pool is configured are interchangeable. In a case where a TCI pool for DL is configured, a UL TCI pool may be equal to the configured TCI pool.

In the present disclosure, the channel/RS to which the common TCI is applied may be PDSCH/HARQ-ACK information/PUCCH/PUSCH/CSI-RS/SRS.

In each embodiment of the present disclosure, a pool (list) including a plurality of unified TCI states may be configured/activated for the UE, and one or more TCI states among the plurality of unified TCI states may be indicated. The configuration/activation may be performed using setting information transmitted via higher layer signaling (for example, RRC signaling/MAC CE). An indication may be issued in indication information transmitted using the DCI.

Note that, in the present disclosure, signaling configuration, signaling, setting, configuration, setting information, indication, indication information, list, pool, and the like are interchangeable.

First Embodiment

In a first embodiment, a TCI state configuration/indication method for a plurality of BWPs/CCs will be described.

The UE may receive an RRC parameter for configuring a unified TCI state. The RRC parameter for configuring the unified TCI state may be an existing (Defined in Rel. 15/16) parameter or a parameter newly defined in Rel. 17 and subsequent releases.

The RRC parameter for configuring the unified TCI state may be included in a DL channel configuration parameter. The DL channel setting parameter may be included in, for example, a PDSCH configuration (RRC information element "PDSCH-Config").

In the present disclosure, the UE may apply the configured TCI state as the unified TCI state to a plurality of channels/signals/RS. In the present disclosure, the plurality of channels/signals/RS may be, for example, at least one of CORESET, PDSCH, PDCCH, CSI-RS, PUCCH, PUSCH, and SRS.

<<Method for Configuring TCI State List>>
[Configuration Method 1]

A unified TCI state (list of unified TCI states) may be configured for each CC/BWP. In other words, each of the plurality of TCI state lists configured for the UE may be explicitly associated with a CC/BWP.

In the present disclosure, the configuration of a unified TCI state for CCs/BWPs may mean that a TCI state list including one or more TCI states is configured for CCs/BWPs. The TCI state list may be defined in a PDSCH configuration, for example.

In the present disclosure, the TCI state list configured for each CC/BWP may be at least one list of joint TCI states and separate TCI states (UL only TCI states/DL only TCI states/UL and DL TCI states). Further, in the TCI state list configured for each CC/BWP, at least a portion of the joint TCI state list and a portion of the separate TCI state list may be in common. Further, in the TCI state list configured for each CC/BWP, at least a portion of the joint TCI states and a portion of the separate TCI states may be a common list.

FIG. 8A is a diagram illustrating an example of a method for configuring a TCI state list according to the first embodiment. In FIG. 8A, a plurality of BWPs (BWP #1 of CC #1 and BWP #1 of CC #2 are described) are configured for the UE. In the example of FIG. 8A, a TCI state list is configured for each BWP. The UE determines the TCI state to apply to the plurality of channels/signals based on the configured TCI state list. That is, in a case as in FIG. 8A, the UE may consider that an independent TCI state list for the unified TCI state is configured for CC #1 and CC #2.

Note that the number of TCI states and the number of CCs/BWPs included in the TCI state list in each drawing representing the TCI state configuration/indication of the present disclosure is merely an example, and the present invention is not limited to this example.

[Configuration method 2]

A unified TCI state (list of unified TCI states) may be configured in units of plural CCs/BWPs. In other words, one or more CCs/BWPs configured for the UE may not be explicitly associated with the TCI state list.

FIG. 8B is a diagram illustrating another example of a method for configuring a TCI state list according to the first embodiment. In FIG. 8B, a plurality of BWPs (BWP #1 in CC #1 and BWP #1 of CC #2 are described) are configured for the UE. In the example of FIG. 8B, a TCI state list is configured in the units of plural BWPs.

In the example of FIG. 8B, the TCI state list is included in the PDSCH configuration in BWP #1 of CC #1, and the TCI state list is not included in (is absent from) the PDSCH configuration in BWP #1 of CC #2.

The UE determines the TCI state to be applied to the plurality of channels/signals in BWP #1 of CC #1 and BWP #1 of CC #2, based on the TCI state list configured for BWP #1 of CC #1 being configured. That is, in the case as in FIG. 8B, the UE can consider that the common TCI state list for the unified TCI state is configured for CC #1 and CC #2.

In the setting 1 and/or the setting 2, the RRC parameter for TCI state configuration defined in Rel. 15/16 may be used in the configuration of the unified TCI state (TCI state list).

Each TCI state (TCI state parameter) included in the TCI state list may include at least a TCI state ID ("tci-StateID"), first QCL type information ("qcl-Type1"), and second QCL type information ("qcl-Type2").

The QCL information ("QCL-Info") configured by the first QCL type information ("qcl-Type1") and the second QCL type information ("qcl-Type2") may include at least one of a cell ID, a BWP ID, an RS ID, and QCL type information.

In a case where both the cell ID and the BWP ID of the source RS of QCL type A/D in the QCL information ("QCL-Info") are absent, the UE may assume that the source RS of QCL type A/D is in the BWP/CC to which the TCI state is applied.

Further, in a case where the cell ID and/or the BWP ID of the source RS of QCL type A/D in the QCL information ("QCL-Info") is/are absent, the UE may assume that the source RS of QCL type A/D is in the BWP/CC to which the TCI state is applied.

In a case where the cell ID and/or the BWP ID of the source RS of QCL type A/D in the QCL information ("QCL-Info") is absent, the UE may discriminate whether the QCL information is a cell for which a TCI state is configured or whether each CC is a cell referred to as a QCL source RS when a common TCI state list is configured between cells (CCs), based on the configuration of a specific higher layer parameter (for example, a parameter related to the unified TCI state/a parameter related to the unified TCI state of a plurality of CCs/BWPs).

Note that, in a case where the TCI state list is not configured for each CC/BWP/PDSCH configuration (that is, in a case where the TCI state list is not configured in plural CC/BWP/PDSCH configuration units), the UE may receive configuration information indicating which CC/BWP the TCI state list is corresponding to is used/referred to for a CC/BWP for which the TCI state list is not configured. The configuration information may be set for each CC/BWP/PDSCH configuration.

For example, in the example of FIG. 8B, the TCI state list is not configured for BWP #1 of CC #2, but information regarding the reference destination CC/BWP index (ID, here, BWP #1 of CC #1) may be configured so as to use/refer to the TCI state list in BWP #1 of CC #1.

In this case, the UE may not receive the CC/BWP list of the application destination (may not be configured). This is because the CC/BWP list is not necessary in order to receive information regarding the reference destination CC/BWP.

Note that the information regarding the reference destination CC/BWP (reference destination CC/BWP index (ID), reference CC/BWP index (ID)) may be notified by the MAC CE. The UE may determine the reference destination CC/BWP index (ID) from the CC/BWP index notified by the MAC CE among a plurality of CC/BWP indexes configured by RRC.

According to the foregoing method of configuring a TCI state list, it is possible to appropriately configure unified TCI states/a list of unified TCI states for a plurality of CCs/BWPs.

<<TCI State Indication Method>>

Hereinafter, a method of indicating the TCI state after the above-described TCI state list is configured will be described.

The UE may indicate one TCI state from the configured TCI state list. The TCI state indication may be performed by the MAC CE and/or the DCI.

[Indication Method 1]

A method of indicating the TCI state corresponding to the above configuration method 1 will be described hereinbelow. Hereinafter, a unified TCI state/list of unified TCI states may be configured for each CC/BWP.

The UE may indicate the TCI state in each CC/BWP from the TCI state list configured for each CC/BWP.

The indication of the TCI state in each CC/BWP may be performed using common (one) MAC CE/DCI. By using the common MAC CE/DCI, signaling overhead can be reduced.

The common (one) MAC CE/DCI may include a plurality of fields indicating the TCI state. A plurality of fields may correspond to a plurality of CCs/BWPs, respectively.

Furthermore, the common (one) MAC CE/DCI may include a field indicating a combination of one or more TCI states. A plurality of candidates for the combination may be configured by the RRC IE or may be specified in the specification.

Note that the common (one) MAC CE/DCI application/timeline will be described in detail below.

In addition, the indication of the TCI state in each CC/BWP may be performed using MAC CE/DCI which is independent for each CC/BWP. The use of independent MAC CE/DCI enables more flexible control.

FIG. 9A is a diagram illustrating an example of a method for indicating a TCI state list according to the first embodiment. The configuration of the plurality of BWPs and TCI state lists in FIG. 9A is similar to that in FIG. 8A.

In the example of FIG. 9A, the TCI state for each CC is indicated to the UE using MAC CE/DCI. The UE determines the TCI state to apply to the plurality of channels/signals based on the indication (in the example of FIG. 9A, the TCI state #2 is determined for both CC #1 and CC #2).

[[Application of Common MAC CE/DCI]]

Hereinafter, the timing from indication of a beam based on the above-described common MAC CE/DCI (for example, a common TCI state) until application of the beam will be described.

In the present disclosure, timing from indication of a DCI-based beam (for example, a common TCI state) to application of the beam, the beam application time, the period until beam application, and the like are interchangeable.

Furthermore, in the present disclosure, the timing of the start of the beam application time may be the timing (for example, a symbol, a slot, or a particular time unit) of the start of reception (alternatively, the end of reception) of the DCI indicating the application of the beam (for example, the common TCI state). Furthermore, the timing of the start of the beam application time may be the timing (for example, a symbol, a slot, or a particular time unit) of the start of transmission (alternatively, the end of transmission) of the HARQ-ACK information for the DCI indicating the application of the beam (for example, the common TCI state).

Note that, as the DCI indicating the beam application, any DCI format defined before Rel. 16 may be used, or a new DCI format defined in Rel. 17 and subsequent releases may be used.

In the present disclosure, the beam application time for a CC/BWP receiving DCI indicating beam application may be referred to as the first beam application time. In addition, the beam application time for a CC/BWP different from the CC/BWP that receives the DCI indicating beam application may be referred to as the second beam application time.

The UE may assume that the first beam application time and the second beam application time are prescribed/configured/indicated to be the same/different. For example, the UE may assume that the second beam application time is longer (or shorter) than the first beam application time or is prescribed/configured/indicated to be equal to the first beam application time.

In addition, when operating a unified TCI state framework in CA, the UE may assume that beam application times of a plurality of (for example, all) CCs included in a list of CCs to which the unified TCI state is applied (an application CC list) are prescribed/configured/indicated to be equal. According to this method, because the beam application time is different for each CC, it is possible to avoid a situation where the TCI state is different for each CC and CA cannot be appropriately performed.

The UE may assume that the same beam application time as the longest beam application time among the beam application times for each CC included in the application CC list is prescribed/configured/indicated.

Further, the UE may assume that the same beam application time as the longest beam application time among the beam application times for each CC included in the application CC list is prescribed/configured/indicated.

The UE may be configured with a beam application time for each CC/for each BWP of the CC. The UE may receive the information regarding the configuration of the beam application time for each CC/for each BWP of the CC by using higher layer signaling (for example, RRC signaling).

At this time, the beam application time for each CC/BWP may be different or may be a common value.

A beam application time may be configured for each band (alternatively, for every plurality of CCs/BWPs). The UE may receive the information regarding the configuration of the beam application time for each of the plurality of CCs/BWPs by using higher layer signaling (for example, RRC signaling).

The beam application time for each CC/BWP may be different or may be a common value. For example, the applicable beam application time may be calculated for all CCs based on the process time of the UE for each CC, and the beam application time for each CC/BWP may be a common value.

In a case where the beam application time for each CC/BWP is different, the UE may receive information regarding the beam application time for each CC/BWP.

In addition, when the beam application time for each CC/BWP is different, the UE may receive information regarding the beam application time for a certain CC/BWP, and determine, based on a specific rule, the beam application time for another CC/BWP. For example, the UE may receive information regarding the first beam application time, and determine the second beam application time based on a specific rule.

The specific rule may be that a specific offset value for the first beam application time is notified to the UE, and the UE determines the second beam application time by adding/subtracting the specific offset value to/from the first beam application time.

The specific offset value may be configured using higher layer signaling for the UE, may be predefined by a specification, or may be reported to a NW (network, for example, a base station) as UE capability information.

The UE may configure a beam application time for each application CC list. The UE may receive information regarding the configuration of the beam application time for each application CC list by using higher layer signaling (for example, RRC signaling). It is thus possible to cope with a situation where the beam application time differs depending on the number of CCs and the bandwidth included in each application CC list.

The UE may be configured having a beam application time for each common TCI state. The UE may receive information regarding the configuration of the beam application time for each common TCI state by using higher layer signaling (for example, RRC signaling)/DCI. Thus, a different beam application time can be configured for each indicated TCI state, and the beam application time can be indicated by the DCI.

[Indication Method 2]

A method of indicating the TCI state corresponding to the above configuration method 2 will be described hereinbelow. Hereinafter, the unified TCI state/unified TCI state list may be configured in units of plural CCs/BWPs.

The UE may indicate one TCI state from the configured TCI state list. The UE may determine/discriminate that the indicated TCI state is a TCI state in the plurality of CCs/BWPs.

The indication of the TCI state may be performed using common (one) MAC CE/DCI. By indicating the TCI state in a certain CC/BWP using one MAC CE/DCI, the TCI state in other CCs/BWPs can also be indicated/updated. The UE may also update the TCI state in other CCs/BWPs when the TCI state in the certain CC/BWP is indicated.

FIG. 9B is a diagram illustrating another example of the method of indicating the TCI state list according to the first embodiment. The configuration of the plurality of BWPs and TCI state lists in FIG. 9B is similar to that in FIG. 8B.

In the example of FIG. 9B, the TCI state of the BWP #1 for CC #1 is indicated to the UE by using the MAC CE/DCI. The UE determines the TCI state to be applied to the plurality of channels/signals in BWP #1 of CC #1 and the plurality of channels/signals in BWP #1 of CC #2, based on this indication.

According to the foregoing TCI state indication method, it is possible to appropriately indicate unified TCI states for a plurality of CCs/BWPs.

<<Method for Configuring QCL Information>>

Hereinafter, the QCL information included in the TCI state configured by the RRC will be described.

The configuration of QCL information may be applied in a case where at least one of Cases 1 to 3 of the above-described QCL constraints is satisfied.

[QCL Information 1]

QCL information corresponding to the above configuration method 1 and the indication method 1 will be described hereinbelow. Hereinafter, a unified TCI state/list of unified TCI states may be configured/indicated for each CC/BWP.

[[QCL Information 1-1]]

The following may be applied when an RS of a CC/BWP-specific first QCL type (for example, QCL type D) is configured for the UE. A case where an RS of the CC/BWP-specific first QCL type (for example, QCL type D) is configured may correspond to, for example, Case 1/Case 3 described above.

The TCI states of the TCI state list being configured (the parameters of the TCI states) may include at least a TCI state ID ("tci-StateID"), (configuration) information of the first QCL type ("qcl-Type1"), and (configuration) information of the second QCL type ("qcl-Type2").

The information regarding the serving cell (cell-related field (cell ID, "Cell")) may not exist in the information of the first QCL type ("qcl-Type1") and the information of the second QCL type ("qcl-Type2").

The BWP-related information (the BWP ID-related field ("bwp-ID")) may not exist in the first QCL type ("qcl-Type1") information and the second QCL type ("qcl-Type2") information. Further, the BWP-related information (the BWP ID-related field ("bwp-ID")) is included in the first QCL type information ("qcl-Type1") and the second QCL type information ("qcl-Type2"), and the BWP ID-related field may indicate a specific value (for example, 1).

The first QCL type information ("qcl-Type1") and the second QCL type information ("qcl-Type2") may include a reference signal-related field ("referenceSignal").

The first QCL type information ("qcl-Type1") and the second QCL type information ("qcl-Type2") may include a QCL type-related field ("qcl-Type").

FIG. 10A is a diagram illustrating an example of a method for configuring QCL information according to the first embodiment.

Hereinafter, a case where the TCI state #2 is indicated in the BWP #1 of CC #1 described in FIG. 9A will be considered using FIG. 10A. In the example of FIG. 10A, the QCL information ("qcl-Type1" and "qcl-Type2") of the TCI state #2 for the BWP #1 of CC #1 is illustrated. In the example of FIG. 10A, the QCL information ("qcl-Type1" and "qcl-Type2" respectively) does not include "Cell" and "bwp-ID" (same are absent). Further, "referenceSignal" is included in the QCL information ("qcl-Type1" and "qcl-Type2" respectively), and NZP CSI-RS #5 is configured for each piece of QCL information. In addition, "qcl-Type" is included in the QCL information ("qcl-Type1" and "qcl-Type2" respectively), "qcl-Type" of "qcl-Type1" is configured as "typeA", and "qcl-Type" of "qcl-Type2" is configured as "typeD".

At this time, the UE discriminates the NZP CSI-RS #5 of the target CC (that is, the CC of the DMRS to which the TCI state is applied) to be a QCL type A/D RS, in the BWP #1 of CC #1.

[[QCL Information 1-2]]

The following may be applied in a case where an RS of a CC/BWP common first QCL type (for example, QCL type D) is configured for the UE. A case where an RS of a CC/BWP common first QCL type (for example, QCL type D) is configured, this is equivalent to Case 2 above, for example.

Each TCI state (TCI state parameter) included in the TCI state list being configured may include at least a TCI state ID ("tci-StateID"), first QCL type information ("qcl-Type1"), and second QCL type information ("qcl-Type2").

There may be no cell-related field (Cell ID, "Cell") in the first QCL type information ("qcl-Type1").

The second QCL type information ("qcl-Type2") may not include a cell-related field (Cell ID, "Cell").

There may be no BWP ID-related field ("bwp-ID") in the first QCL type information ("qcl-Type1"). Further, the first QCL type information ("qcl-Type1") may include a BWP ID-related field ("bwp-ID"), and the BWP ID-related field may indicate a specific value (for example, 1).

The second QCL type information ("qcl-Type2") may include a BWP ID-related field ("bwp-ID").

The first QCL type information ("qcl-Type1") and the second QCL type information ("qcl-Type2") may include a reference signal-related field ("referenceSignal").

The first QCL type information ("qcl-Type1") and the second QCL type information ("qcl-Type2") may include a QCL type-related field ("qcl-Type").

FIG. 10B is a diagram illustrating another example of a method for configuring QCL information according to the first embodiment.

Hereinafter, a case where the TCI state #2 is indicated in the BWP #1 of CC #1 described in FIG. 9A will be considered using FIG. 10B. In the example of FIG. 10B, the QCL information ("qcl-Type1" and "qcl-Type2") of the TCI state #2 with respect to the BWP #1 of CC #1 is illustrated. In the example of FIG. 10B, "qcl-Type1" does not include "Cell" and "bwp-ID" (same are absent). In addition, "qcl-Type2" includes "Cell" and "bwp-ID", and cell #2 is configured for each. Further, "referenceSignal" is included in the QCL information ("qcl-Type1" and "qcl-Type2" respectively), and NZP CSI-RS #5 is configured for each piece of QCL information. In addition, "qcl-Type" is included in the QCL information ("qcl-Type1" and "qcl-Type2" respectively), "qcl-Type" of "qcl-Type1" is configured as "typeA", and "qcl-Type" of "qcl-Type2" is configured as "typeD".

At this time, the UE discriminates the NZP CSI-RS #5 of the target CC (that is, the CC of the DMRS to which the TCI state is applied) to be a QCL type A RS, in the BWP #1 of CC #1. Furthermore, the UE discriminates that the NZP CSI-RS #5 of the CC (for example, CC #2 corresponding to cell #2) explicitly indicated by "qcl-Type2" is the QCL type D RS.

Note that, in the examples illustrated in FIGS. 10A and 10B, the case where the QCL type A RS and the QCL type D RS are the same RS has been described, but the present invention is not limited thereto. In accordance with the above-described QCL constraints (Cases 1 to 3), cases where the QCL type A RS and the QCL type D RS are different RSs may also be considered.

[QCL Information 2]

QCL information corresponding to the above configuration method 2 and the indication method 2 will be described hereinbelow. Hereinafter, the unified TCI state/unified TCI state list may be configured/indicated in units of plural CCs/BWPs.

[[QCL Information 2-1]]

The following may be applied when an RS of a CC/BWP-specific first QCL type (for example, QCL type D) is configured for the UE.

In the present embodiment, the TCI state of the TCI state list being configured may be the same as in the configuration of the TCI state disclosed in the QCL information 1-1 described above.

Hereinafter, a case where the TCI state #2 is indicated in BWP #1 of CC #1 disclosed in FIG. 9B will be considered using FIG. 10A.

At this time, the UE discriminates the NZP CSI-RS #5 of the target CC (that is, the CC of the DMRS to which the TCI state is applied) to be a QCL type A/D RS, in a plurality of (all, for example) CCs/BWPs included in the CC/BWP list.

[[QCL Information 2-2]]

The following may be applied in a case where an RS of a CC/BWP common first QCL type (for example, QCL type D) is configured for the UE.

In the present embodiment, the TCI state of the TCI state list being configured may be the same as in the configuration of the TCI state disclosed in the QCL information 1-2 described above.

Hereinafter, a case where the TCI state #2 is indicated in BWP #1 of CC #1 disclosed in FIG. 9B will be considered using FIG. 10B.

At this time, the UE discriminates the NZP CSI-RS #5 of the target CC (that is, the CC of the DMRS to which the TCI state is applied) to be a QCL type A RS, in a plurality of (all, for example) CCs/BWPs included in the CC/BWP list. Furthermore, the UE discriminates that the NZP CSI-RS #5 of the CC (for example, CC #2 corresponding to cell #2) explicitly indicated by "qcl-Type2" is the QCL type D RS.

According to the foregoing method for configuring a QCL information, it is possible to appropriately configure/indicate QCL information corresponding to unified TCI states for a plurality of CCs/BWPs.

Second Embodiment

In a second embodiment, a method of configuring a CC/BWP list using RRC signaling will be described.

For the UE, the CC/BWP list may be configured/notified using the RRC signaling.

The CC/BWP list configured for the UE may be one or two lists. Further, the CC/BWP list configured for the UE may be one or more (two or more) lists.

The UE may configure a CC/BWP list by using RRC parameters (for example, at least one of "simultaneousSpatial-UpdatedList1-r16", "simultaneousSpatial-UpdatedList2-r16", "simultaneousTCI-UpdateList1-r16", and "simultaneousTCI-UpdateList2-r16") for simultaneous beam updates for a plurality of CCs as defined in Rel. 16.

In addition, the UE may configure the CC/BWP list by using a new RRC parameter as defined in Rel. 17 and subsequent releases.

The CC/BWP list may be configured using cell group units. In addition, the CC/BWP list may be configured for each UE. Further, the CC/BWP list may be configured for each band.

In addition, the CC/BWP list may be configured for each CC/each BWP. In other words, the CC/BWP list may be included in the BWP configuration (RRC parameters). For example, the CC/BWP list may be configured per TCI state/per TCI state list/per PDSCH configuration. In other words, the CC/BWP list may be included in the TCI state configuration (RRC parameter)/TCI state list configuration (RRC parameter)/PDSCH configuration.

For example, in a case where the CC/BWP list can be configured in the TCI state/TCI state list/PDSCH configuration and where the TCI state list is configured for each CC/BWP (that is, a case corresponding to the configuration method 1 described above), the CC/BWP list may not be included in the TCI state, or the CC/BWP list may be included in the TCI state (may explicitly indicate the CC/BWP).

Furthermore, for example, in a case where the CC/BWP list can be configured in the TCI state/TCI state list/PDSCH configuration and where the TCI state list is configured in units of plural CCs/BWPs (that is, a case corresponding to the configuration method 2 described above), the CC/BWP list may not be included in the TCI state.

FIG. 11A is a diagram illustrating an example of a method for configuring a CC/BWP list according to the second embodiment. The example illustrated in FIG. 11A illustrates an example of a case where the TCI state list is configured for each CC/BWP (that is, a case corresponding to the configuration method 1 described above).

In the example illustrated in FIG. 11A, the CC list is included in the PDSCH configuration ("PDSCH-Config") for the UE. The CC list explicitly indicates the CC corresponding to the PDSCH configuration.

Note that, in the example illustrated in FIG. 11A, a case where the CC list is included in the PDSCH configuration has been described, but the CC list may not be included in the PDSCH.

FIG. 11B is a diagram illustrating another example of a method for configuring a CC/BWP list according to the second embodiment. The example illustrated in FIG. 11B illustrates an example of a case where the TCI state list is configured for a plurality of CCs/BWPs (that is, a case corresponding to the configuration method 2 described above).

In the example illustrated in FIG. 11B, the CC list is included in the PDSCH configuration ("PDSCH-Config"), for the UE, of the BWP #1 of the CC #1. That is, the CC list may be configured in the CC in which the TCI state list is configured. The CC list may configure/indicate a CC to which the TCI state list is applied.

According to the foregoing second embodiment, it is possible to appropriately configure a CC/BWP list to which the unified TCI state is applied.

Third Embodiment

In a third embodiment, a method of configuring/notifying/updating/activating a CC/BWP list using a MAC CE will be described.

A CC/BWP list may be configured/notified/updated/activated with respect to the UE by using a MAC CE. The MAC CE may be, for example, a MAC CE that instructs activation/deactivation of a TCI state. The MAC CE that indicates the activation/deactivation of a TCI state may be an existing (defined in Rel. 15/16) MAC CE, or may be a MAC CE defined in Rel. 17 or subsequent releases.

A MAC CE that performs CC/BWP list notification may be a MAC CE that indicates activation/deactivation of a TCI state to be described in detail subsequently.

<<MAC CE Indicating Activation/Deactivation of TCI State>>

The following describes a configuration of a MAC CE that indicates activation/deactivation of a TCI state in the unified TCI state framework.

The MAC CE (first MAC CE) indicating the joint TCI and the MAC CE (second MAC CE) indicating the separate TCI state may be different MAC CEs. In other words, the first MAC CE and the second MAC CE may take different configurations/forms.

The first MAC CE may indicate only a joint TCI state. The UE may indicate activation/deactivation of a joint TCI state based on the first MAC CE.

One TCI state (TCI state ID) may be indicated to the UE by using the first MAC CE, for each TCI field (code point) of the DCI.

The second MAC CE may indicate only a separate TCI state. The UE may indicate activation/deactivation of a separate TCI state based on the second MAC CE.

One TCI state (for example, the TCI state of only DL or the TCI state of only UL) or two TCI states (DL and UL TCI states) may be indicated to the UE by using the second MAC CE, for each TCI field (code point) of the DCI.

FIG. 12 is a diagram illustrating an example of a TCI state indication according to the third embodiment. A TCI state list including one or more TCI states is configured for the UE by using higher layer signaling (for example, RRC signaling). In the UE, a joint TCI state may be indicated by the first MAC CE and a separate TCI state may be indicated by the second MAC CE.

Note that, in the present disclosure, the UE may discriminate whether a notified MAC CE is a MAC CE of the unified TCI framework or an existing MAC CE (defined by Rel. 15/16) from at least one of a specific bit field (for example, reserved bits), a MAC subheader, and an LCID that are included in the MAC CE.

Embodiment 3-1 and/or Embodiment 3-2 described hereinbelow may be applied to the MAC CE indicating the TCI state activation/deactivation according to the present embodiment.

Embodiment 3-1

A MAC CE defined in Rel. 15/16 may be used for the first MAC CE and/or the second MAC CE.

The first MAC CE and/or the second MAC CE may appropriate a MAC CE defined in Rel. 15/16. The first MAC CE and/or the second MAC CE may also be a MAC CE obtained by extending a MAC CE defined in Rel. 15/16.

For example, the first MAC CE may be a MAC CE (for example, TCI States Activation/Deactivation for UE-specific PDSCH MAC CE) that indicates activation/deactivation of a TCI state of a UE-specific PDSCH (see FIG. 5).

For example, the second MAC CE may be a MAC CE (for example, Enhanced TCI States Activation/Deactivation for UE-specific PDSCH MAC CE) that indicates activation/deactivation of a TCI state of a UE-specific PDSCH (see FIG. 6).

Note that, in the present disclosure, the first MAC CE and the second MAC CE are interchangeable.

Embodiment 3-2

The first MAC CE and/or the second MAC CE may use a MAC CE (which may be referred to as a new MAC CE) defined in Rel. 17 and subsequent releases. Also in Embodiment 4-2, the MAC CE defined in Rel. 15/16 may be used as the first MAC CE and/or the second MAC CE as per Embodiment 4-1 described above.

Figure 13:
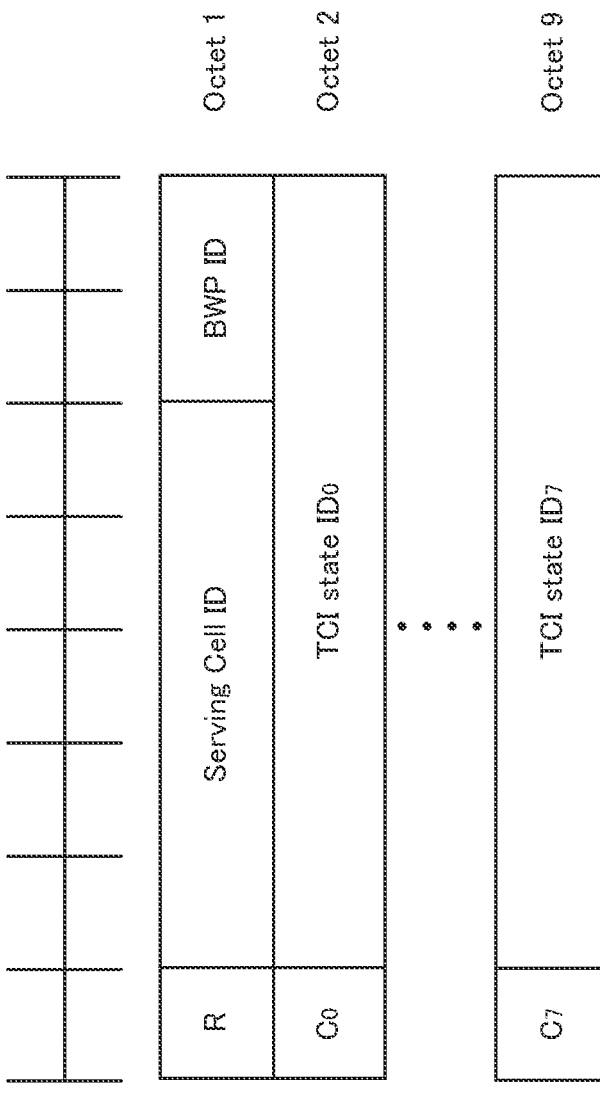
FIG. 13 is a diagram illustrating an example of a MAC CE configuration according to an embodiment 3-2.

The new MAC CE may be a MAC CE that notifies/indicates one TCI state ID corresponding to a code point of each TCI field included in the DCI. For example, the MAC CE may be used as the first MAC CE (see FIG. 13).

The new MAC CE may be a MAC CE that notifies/indicates one or more (for example, two) TCI state IDs corresponding to a code point of each TCI field included in the DCI. For example, the MAC CE may be used as the second MAC CE. The second MAC CE may be the MAC CE described in FIG. 6 above.

The UE may be notified of a CC/BWP list by using a MAC CE (for example, a MAC CE to which Embodiment 3-1/3-2 may be applied) that indicates activation/deactivation of the above-described TCI states.

A field for the CC/BWP list notification may be added to the MAC CE that indicates activation/deactivation of the above-described TCI states. A field other than the field for the CC/BWP list notification may be, for example, a field of a MAC CE indicating activation/deactivation of the above-described TCI states.

A MAC CE for a CC/BWP list indication different from the MAC CE that indicates TCI state activation/deactivation, which includes a field for CC/BWP list notification, may also be defined.

Figures 14A, 14B:
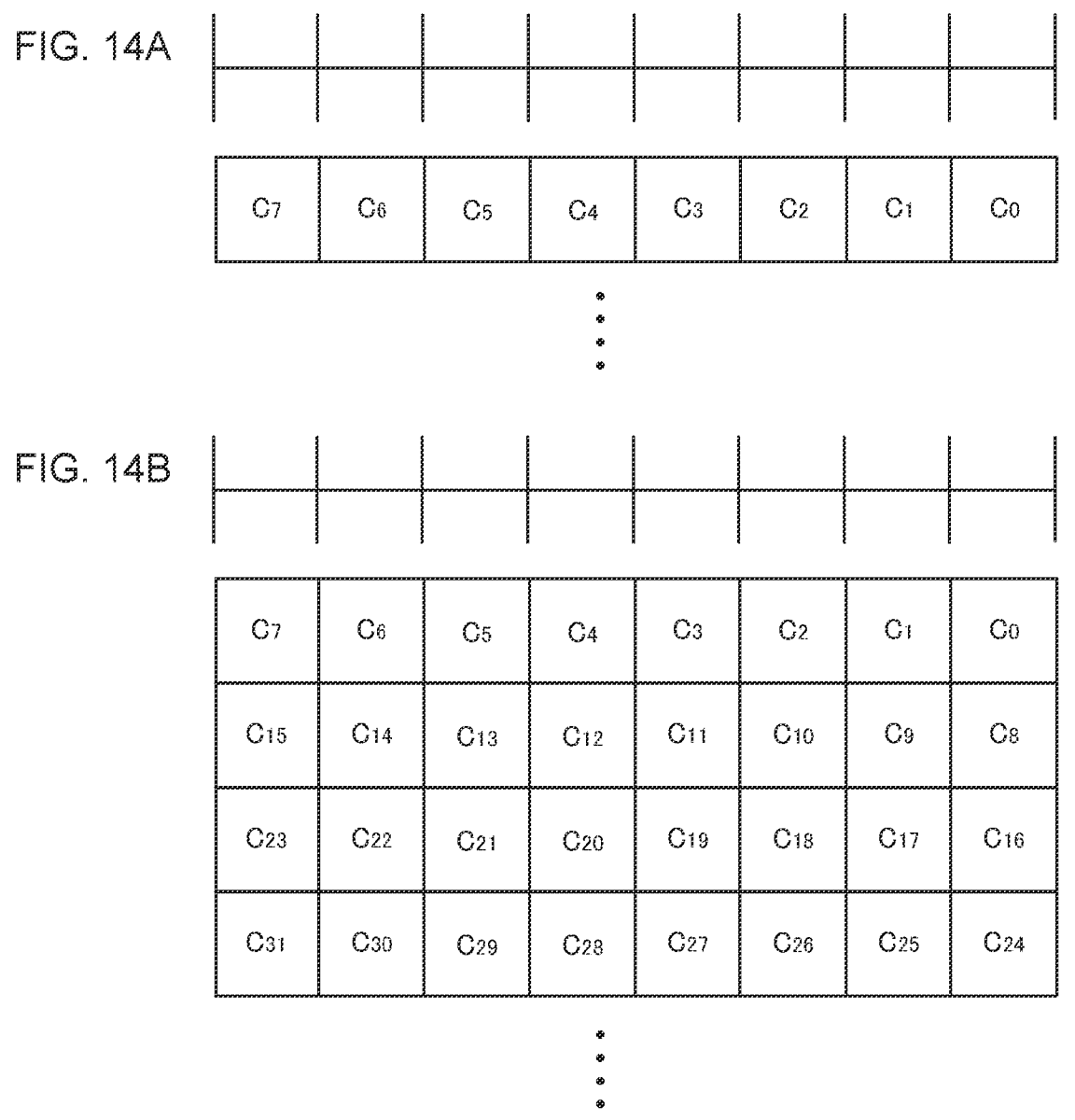

FIGS. 14A and 14B are diagrams illustrating an example of a MAC CE field for CC/BWP list notification. FIG. 14A illustrates a field in a case where the number of CCs/BWPs included in the CC/BWP list is no more than (less than) 8, and FIG. 14B illustrates a field in a case where the number of CCs/BWPs included in the CC/BWP list is at least 8.

The UE may perform notification of/updates to a CC list on the basis of a MAC CE that includes a field (described as $C_i$) for CC/BWP list notification as illustrated in FIGS. 14A and 14B.

For example, a case is considered in which a CC list (CC #0 to CC #7) is configured for the UE by using higher layer signaling (RRC signaling). In the example illustrated in FIG. 14A, when an indication is made that $\{C_0, C_1, \ldots, C_7\}=\{1, 1, 1, 1, 0, 0, 0, 0\}$ in the field for the CC/BWP list notification included in the MAC CE, the UE may discriminate that CC #0 to CC #3 have been indicated as being an active CC list.

Note that, in a case where the TCI state list is configured for each CC/BWP, the UE may assume that the MAC CE performing CC/BWP list notification is not performing notification. Note that, in a case where the TCI state list is configured for each CC/BWP, the UE may assume that a field for CC/BWP list notification does not exist in the MAC CE.

Note that, in a case where the TCI state (list) is configured in units of plural CCs/BWPs (for example, when the TCI state (TCI state list) is not configured in the PDSCH configuration in the at least one CC/BWP), it may be assumed that the MAC CE performing the CC/BWP list notification is notified. Furthermore, in a case where the TCI state (list) is configured in units of plural CCs/BWPs, the UE may assume that there is a field for CC/BWP list notification in the MAC CE.

Note that the UE may perform control/switching using RRC signaling with respect to whether or not there is a field for CC/BWP list notification in the MAC CE.

Variation of Third Embodiment

Note that, in a case where the TCI state list is configured for each CC/BWP, a MAC CE that performs CC/BWP list notification (a MAC CE field for CC/BWP list notification) is not necessary.

Meanwhile, in a case where the TCI state list is configured in units of plural CCs/BWPs (that is, when the TCI state (TCI state list) is not configured in the PDSCH configuration in at least one CC/BWP), a MAC CE for performing CC/BWP list notification (a MAC CE field for performing the CC/BWP list notification) is necessary. In this case, in at least one CC/BWP, a TCI state (TCI state list) is configured in the PDSCH configuration.

Figure 15:
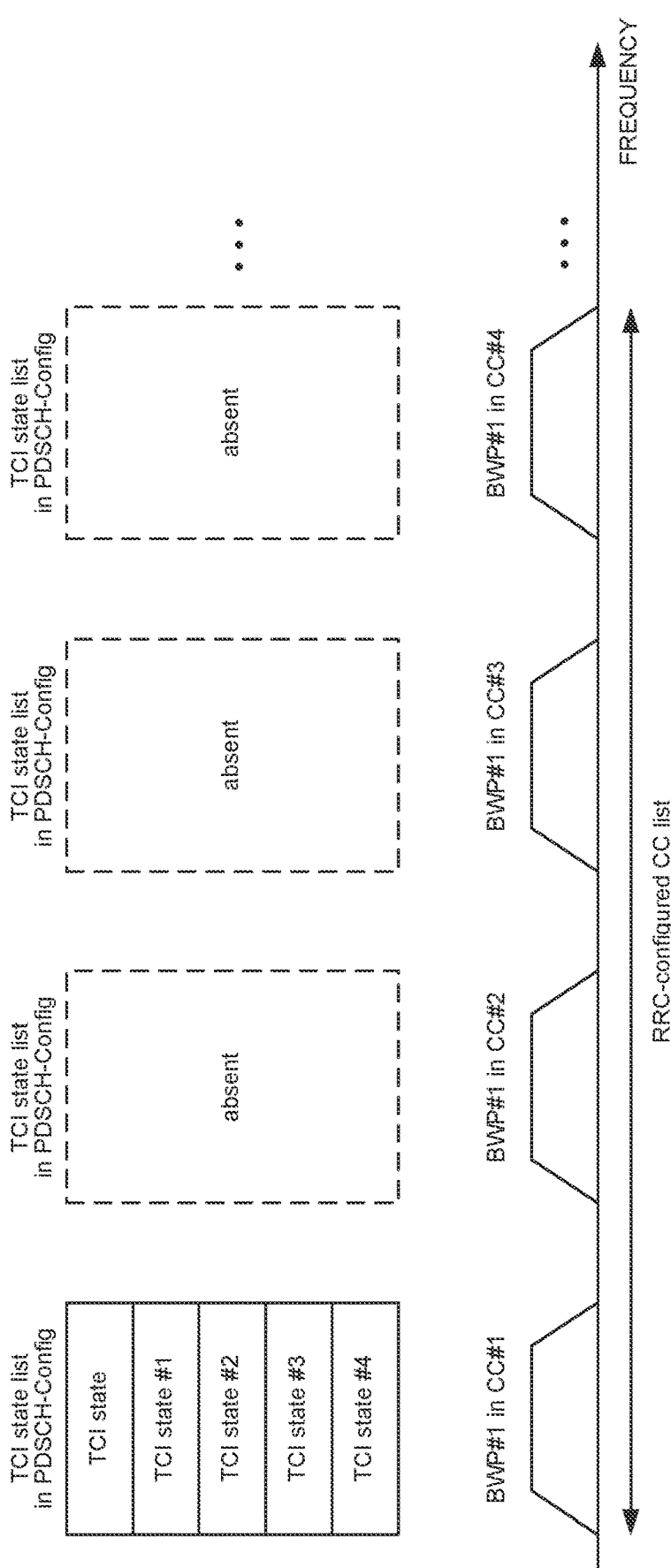
FIG. 15 is a diagram illustrating an example of CC/BWP list notification according to a variation of the third embodiment.

FIG. 15 is a diagram illustrating an example of CC/BWP list notification according to a variation of the third embodiment. In the example illustrated in FIG. 15, the BWP #1 for CC #1, the BWP #1 for CC #2, the BWP #1 for CC #3, and the BWP #1 for CC #4 are configured for the UE by using RRC. In addition, in the UE, the TCI state list is configured in the BWP #1 of the CC #1.

In this case, the CC/BWP (BWP #1 of CC #1) for which the TCI state (TCI state list) is configured may be a CC/BWP included in the active CC/BWP list. In other words, the MAC CE need not be used to perform CC/BWP (BWP #1 of CC #1) for which the TCI state (TCI state list) is configured. In this case, at least one of the MAC CE fields for the CC/BWP list notification described above is unnecessary. The unnecessary field may be used as reserved bits. In addition, the unnecessary field may explicitly indicate a cell (CC/BWP). For example, the MAC CE illustrated in FIG. 14A can also correspond to a case where a number of CCs/BWPs larger than 8 (for example, 9) is configured by RRC.

In this case, the CC/BWP (BWP #1 of CC #1) for which the TCI state (TCI state list) is configured need not necessarily be included in the active CC/BWP list. In this case, all of the MAC CE fields for the CC/BWP list notification described above are necessary. For example, the MAC CE illustrated in FIG. 14A can correspond to a case where up to 8 CCs/BWPs are configured by RRC.

According to the foregoing third embodiment, the configuration/notification/update/activation of the CC/BWP list can be appropriately performed by using the MAC CE.

Fourth Embodiment

A higher layer parameter (RRC IE)/UE capability corresponding to a function (feature) in at least one of the plurality of embodiments described above may be defined. The UE capability may indicate that this function is supported.

A UE for which the higher layer parameter corresponding to the function (enabling the function) is configured may perform the function. "A UE for which a higher layer parameter corresponding to the function is not configured does not perform the function (for example, according to Rel. 15/16)" may be defined.

A UE that has reported a UE capability indicating support for the function may perform the function. "A UE that has not reported a UE capability indicating support for the function does not perform the function (for example, according to Rel. 15/16)" may be defined.

In a case where a UE has reported a UE capability indicating support for the function and for which a higher layer parameter corresponding to the function has been configured, the UE may perform the function. "In a case where a UE has not reported a UE capability indicating support for the function and for which a higher layer parameter corresponding to the function has not been configured, the UE does not perform the function (for example, according to Rel. 15/16)" may be defined.

The UE capability may indicate whether the UE supports this function.

The function may be a unified TCI state framework.

The UE capability may be defined as whether or not at least one of a unified TCI state framework, a joint/separate TCI pool, and a joint/separate beam indication is supported.

The UE capability may be defined by whether or not at least one of joint TCI, separate UL-only TCI, and separate DL-only TCI is supported.

The UE capability may be defined by whether or not the UE operation pertaining to the disclosures of each of the foregoing embodiments is supported.

The UE capability may be defined by whether or not (dynamic) switching of the joint TCI and the separate TCI by the MAC CE is supported. When the UE does not support this UE capability, the UE may perform switching the joint TCI and the separate TCI using RRC.

The UE capability may be defined by whether or not the configuration of the TCI state list for each CC/BWP is supported. The UE capability may be defined by whether or not the configuration of the TCI state list in plural CC/BWP units is supported.

The UE capability may be defined by whether or not CC/BWP list notification using a MAC CE is supported.

The higher layer parameter corresponding to the function (enabling the function) may be a higher layer parameter related to the unified TCI state.

The higher layer parameter corresponding to the function (enabling the function) may be a higher layer parameter related to at least one of joint TCI, separate UL only TCI, and separate DL only TCI.

According to the fourth embodiment hereinabove, the UE can realize the above functions while maintaining compatibility with existing specifications.

(Radio Communication System)

Hereinafter, a configuration of a radio communication system according to one embodiment of the present disclosure will be described. In this radio communication system, communication is performed using any of the radio communication methods according to the foregoing embodiments of the present disclosure, or a combination thereof.

Figure 16:
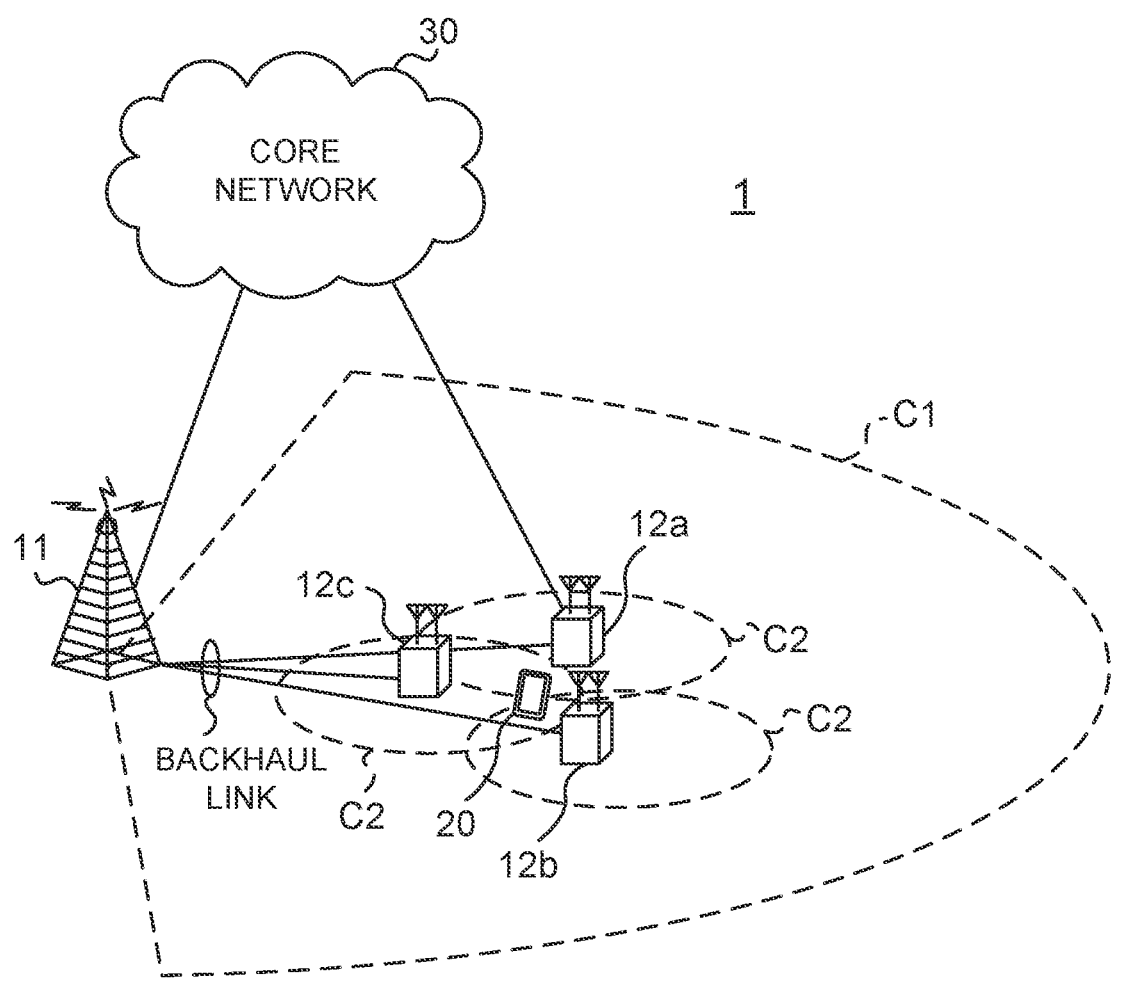
FIG. 16 is a diagram illustrating an example of a schematic configuration of a radio communication system according to one embodiment.

FIG. 16 is a diagram illustrating an example of a schematic configuration of a radio communication system according to one embodiment. The radio communication system 1 may be a system that implements communication by using Long Term Evolution (LTE), 5th generation mobile communication system New Radio (5G NR), and the like drafted as the specification by the Third Generation Partnership Project (3GPP).

Further, the radio communication system 1 may support dual connectivity (Multi-RAT Dual Connectivity (MR-DC)) between a plurality of Radio Access Technologies (RATs). The MR-DC may include dual connectivity between LTE (Evolved Universal Terrestrial Radio Access (E-UTRA)) and NR (E-UTRA-NR Dual Connectivity (EN-DC)), dual connectivity between NR and LTE (NR-E-UTRA Dual Connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR Dual Connectivity (NN-DC)).

The radio communication system 1 may include a base station 11 that forms a macro cell C1 with a relatively wide coverage, and base stations 12 (12a to 12c) that are arranged within macro cell C1 and that form small cells C2 narrower than macro cell C1. A user terminal 20 may be located in at least one cell. The arrangement, number, and the like of cells and the user terminals 20 are not limited to the aspects illustrated in the drawings. Hereinafter, the base stations 11 and 12 will be collectively referred to as the "base stations 10" when the base stations 11 and 12 are not distinguished from each other.

The user terminal 20 may be connected to at least one of the plurality of base stations 10. The user terminal 20 may use Carrier Aggregation (CA) using a plurality of Component Carriers (CCs), and/or dual connectivity (DC).

Each CC may be included in a first Frequency Range 1 (FR1) and/or a second Frequency Range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of FR1 and FR2 are not limited thereto, and, for example, FR1 may correspond to a frequency band higher than that of FR2.

Further, the user terminal 20 may perform communication in each CC by using Time Division Duplex (TDD) and/or Frequency Division Duplex (FDD).

The plurality of base stations 10 may be connected by wire (for example, an optical fiber or an X2 interface in compliance with Common Public Radio Interface (CPRI) or wirelessly (for example, NR communication). For example, when NR communication is used as a backhaul between the base stations 11 and 12, the base station 11 corresponding to a host station may be referred to as an Integrated Access Backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an Evolved Packet Core (EPC), a 5G Core Network (5GCN), or a Next Generation Core (NGC), or the like.

The user terminal 20 may a terminal that corresponds to at least one of LTE, LTE-A, and 5G or other such communication methods.

In the radio communication system 1, a radio access method based on Orthogonal Frequency Division Multiplexing (OFDM) may be used. For example, in a Downlink (DL) and/or an Uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access method.

In the radio communication system 1, as a downlink channel, a Physical Downlink Shared Channel (PDSCH), a Physical Broadcast Channel (PBCH), a Physical Downlink Control Channel (PDCCH), or the like, which is shared by the user terminals 20, may be used.

Further, in the radio communication system 1, as an uplink channel, a Physical Uplink Shared Channel (PUSCH), a Physical Uplink Control Channel (PUCCH), a Physical Random Access Channel (PRACH), or the like, which is shared by the user terminals 20, may be used.

User data, higher layer control information, a System Information Block (SIB), and the like are transmitted by the PDSCH. User data, higher layer control information, and the like may be transmitted by the PUSCH. Furthermore, a Master Information Block (MIB) may be transmitted by the PBCH.

Lower layer control information may be transmitted by the PDCCH. Lower layer control information may include, for example, Downlink Control Information (DCI) including PDSCH and/or PUSCH scheduling information.

Note that the DCI for scheduling PDSCH may be referred to as DL assignment, DL DCI, or the like, and that the DCI for scheduling PUSCH may be referred to as a UL grant, UL DCI, or the like. Note that PDSCH is interchangeable with DL data, and PUSCH is interchangeable with UL data.

For PDCCH detection, a COntrol REsource SET (CORESET) and a search space may be used. A CORESET corresponds to a resource that searches for DCI. The search space corresponds to a search area and a search method for PDCCH candidates. One CORESET may be associated with one or more search spaces. The UE may monitor the CORESET related to a certain search space, based on the search space configuration.

One search space may correspond to a PDCCH candidate corresponding to one or more aggregation levels. One or more search spaces may be referred to as a search space set. Note that "search space" and "search space set", "search space configuration" and "search space set configuration", and "CORESET" and "CORESET configuration", and the like in the present disclosure are interchangeable.

Uplink Control Information (UCI) including at least one of Channel State Information (CSI), delivery acknowledgement information (which may be referred to as, for example, a Hybrid Automatic Repeat reQuest ACKnowledgement (HARQ-ACK), ACK/NACK, or the like), or a Scheduling Request (SR) may be transmitted by the PUCCH. A random access preamble for establishing a connection with a cell may be transmitted by a PRACH.

Note that, in the present disclosure, downlink, uplink, and the like may be expressed without adding "link". Various channels may also be expressed without adding "physical" in front of the channels.

In the radio communication system 1, a Synchronization Signal (SS), a Downlink Reference Signal (DL-RS), and the like may be transmitted. In the radio communication system 1, a Cell-specific Reference Signal (CRS), a Channel State Information Reference Signal (CSI-RS), a DeModulation Reference Signal (DMRS), a Positioning Reference Signal (PRS), a Phase Tracking Reference Signal (PTRS), or the like may be transmitted as the DL-RS.

The synchronization signal may be, for example, at least one of a Primary Synchronization Signal (PSS) or a Secondary Synchronization Signal (SSS). A signal block including the SS (PSS, SSS) and the PBCH (and the DMRS for PBCH) may be referred to as an SS/PBCH block, an SS block (SSB), or the like. Note that the SS, the SSB, or the like may also be referred to as a reference signal.

Furthermore, in the radio communication system 1, a measurement reference signal (Sounding Reference Signal (SRS)), a demodulation reference signal (DMRS), or the like may be transmitted as an Uplink Reference Signal (UL-RS). Note that, DMRS may be referred to as a "user terminal-specific reference signal (UE-specific Reference Signal)".

(Base Station)

Figure 17:
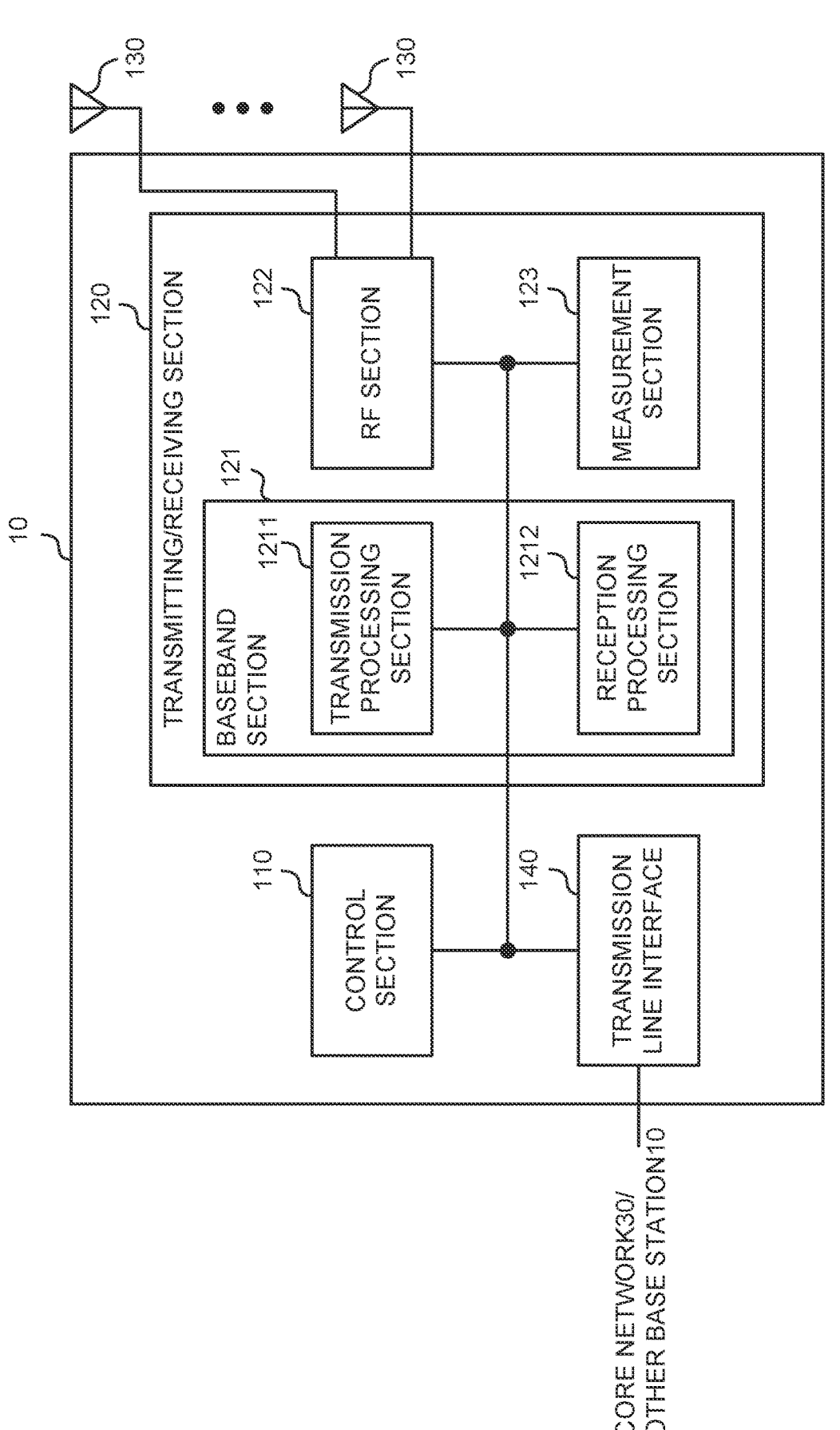
FIG. 17 is a diagram illustrating an example of a configuration of a base station according to one embodiment.

FIG. 17 is a diagram illustrating an example of a configuration of the base station according to one embodiment. The base station 10 includes a control section 110, a transmitting/receiving section 120, a transmitting/receiving antenna 130, and a transmission line interface 140. Note that one or more control sections 110, transmitting/receiving sections 120, transmitting/receiving antennas 130, and transmission line interfaces 140, respectively, may also be provided.

Note that this example mainly describes a functional block of a characterizing part according to the present embodiment, and it may be assumed that the base station 10 also has another functional block necessary for radio communication. Part of the processing by each section described hereinbelow may be omitted.

The control section 110 controls the entire base station 10. The control section 110 can be constituted by a controller, a control circuit, and the like that are described based on common understanding in the technical field according to the present disclosure.

The control section 110 may control signal generation, scheduling (for example, resource allocation or mapping), and the like. The control section 110 may control transmission/reception, measurement, and the like that uses the transmitting/receiving section 120, the transmitting/receiving antenna 130, and the transmission line interface 140. The control section 110 may generate data to be transmitted as a signal, control information, a sequence, and the like, and may forward same to the transmitting/receiving section 120. The control section 110 may perform call processing (such as the configuration and release) of a communication channel, management of the state of the base station 10, and management of radio resources, and the like.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common understanding in the technical field pertaining to the present disclosure.

The transmitting/receiving section 120 may be configured as an integrated transmitting/receiving section, or may be configured by a transmitting section and a receiving section. The transmitting section may be configured from the transmission processing section 1211 and the RF section 122. The receiving section may be configured from the reception processing section 1212, the RF section 122, and the measurement section 123.

The transmitting/receiving antenna 130 can be constituted by an antenna, for example, an array antenna or the like, which is described based on common understanding in the technical field according to the present disclosure.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form a Tx beam and/or a reception beam by using digital beam forming (for example, precoding), analog beam forming (for example, phase rotation), and the like.

The transmitting/receiving section 120 (transmission processing section 1211) may perform Packet Data Convergence Protocol (PDCP) layer processing, Radio Link Control (RLC) layer processing (for example, RLC retransmission control), Medium Access Control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correcting coding), modulation, mapping, filtering processing, Discrete Fourier Transform (DFT) processing (if necessary), Inverse Fast Fourier Transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, and the like on the signal in the radio frequency band received by the transmitting/receiving antenna 130.

The transmitting/receiving section 120 (reception processing section 1212) may apply reception processing such as analog-digital conversion, Fast Fourier Transform (FFT) processing, Inverse Discrete Fourier Transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform Radio Resource Management (RRM) measurement, Channel State Information (CSI) measurement, and the like, based on the received signal. The measurement section 123 may measure received power (for example, Reference Signal Received Power (RSRP)), received quality (for example, Reference Signal Received Quality (RSRQ), a Signal to Interference plus Noise Ratio (SINR), a Signal to Noise Ratio (SNR)), signal strength (for example, Received Signal Strength Indicator (RSSI)), propagation path information (for example, CSI), and the like. The measurement result may be outputted to the control section 110.

The transmission line interface 140 may transmit/receive a signal (backhaul signaling) to and from an apparatus included in the core network 30, another base station 10, or the like, and may perform steps such as acquiring and transmitting user data (user plane data), control plane data, and the like for the user terminal 20.

Note that the transmitting section and the receiving section of the base station 10 according to the present disclosure may be configured from at least one of the transmitting/receiving section 120, the transmitting/receiving antenna 130, or the transmission line interface 140.

The transmitting/receiving section 120 may transmit one or more first Radio Resource Control (RRC) information elements relating to a list of TCI states including a plurality of transmission configuration indication (TCI) states applicable to a plurality of types of channels, and one or more second RRC information elements relating to configuration of one or more serving cells or one or more bandwidth parts. When the first RRC information element is not associated with a specific serving cell or a specific bandwidth part, the control section 110 may determine one or more TCI states used for the specific serving cell or the specific bandwidth part based on the first RRC information element and the second RRC information element.

The transmitting/receiving section 120 may transmit a Medium Access Control (MAC) control element indicating a serving cell or bandwidth part to be activated among the one or more serving cells or the one or more bandwidth parts (first and third embodiments).

(User Terminal)

Figure 18:
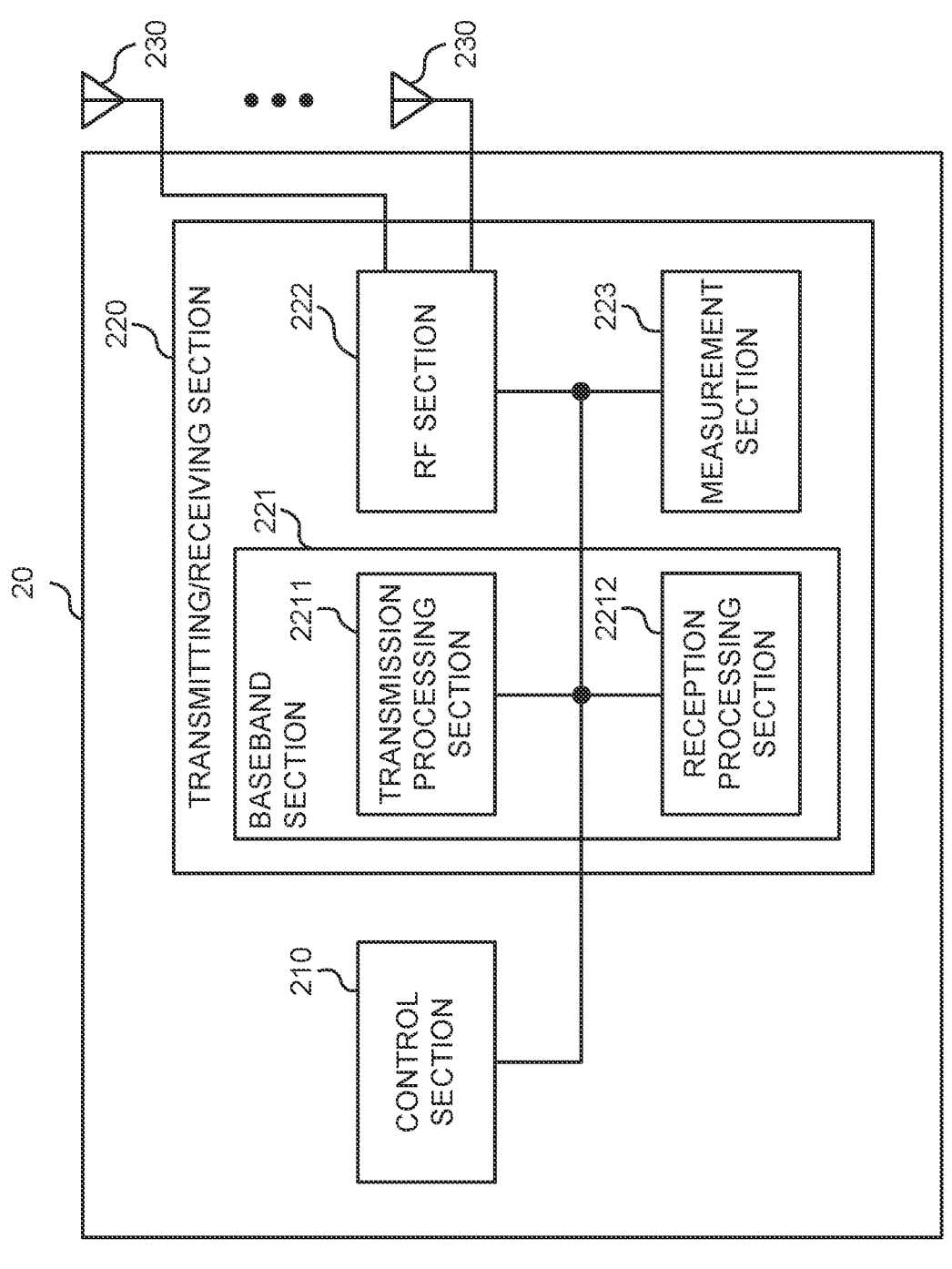
FIG. 18 is a diagram illustrating an example of a configuration of a user terminal according to one embodiment.

FIG. 18 is a diagram illustrating an example of a configuration of a user terminal according to one embodiment. The user terminal 20 includes a control section 210, a transmitting/receiving section 220, and a transmitting/receiving antenna 230. Note that one or more of the control sections 210, the transmitting/receiving sections 220, and the transmitting/receiving antennas 230, respectively, may be provided.

Note that this example mainly describes a functional block of a characterizing part according to the present embodiment, and it may be assumed that the user terminal 20 also has other functional blocks that are necessary for radio communication. Part of the processing by each section described hereinbelow may be omitted.

The control section 210 controls the entire user terminal 20. The control section 210 can be constituted by a controller, a control circuit, and the like that are described based on common understanding in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals, and may forward same to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmitting/receiving circuit, and the like, which are described based on common understanding in the technical field according to the present disclosure.

The transmitting/receiving section 220 may be configured from an integrated transmitting/receiving section, or may be configured from a transmitting section and a receiving section. The transmitting section may be configured from the transmission processing section 2211 and the RF section 222. The receiving section may be configured from the reception processing section 2212, the RF section 222, and the measurement section 223.

The transmitting/receiving antenna 230 can be constituted by an antenna, for example, an array antenna or the like, which is described based on common understanding in the technical field according to the present disclosure.

The transmitting/receiving section 220 may receive the above-described downlink channel, synchronization signal, downlink reference signal, and the like. The transmitting/ receiving section 220 may transmit the above-described uplink channel, uplink reference signal, and the like.

The transmitting/receiving section 220 may form a Tx beam and/or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correcting coding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a certain channel (for example, PUSCH), the transmitting/receiving section 220 (transmission processing section 2211) may perform DFT processing as the transmission processing in order to transmit the channel using a DFT-s-OFDM waveform, and otherwise need not perform DFT processing as the transmission processing.

The transmitting/receiving section 220 (RF section 222) may perform modulation to a radio frequency range, filtering processing, amplification, and the like on the baseband signal, and transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be outputted to the control section 210.

Note that the transmitting section and the receiving section of the user terminal 20 in the present disclosure may by constituted by at least one of the transmitting/receiving section 220, the transmitting/receiving antenna 230, and the transmission line interface 240.

The transmitting/receiving section 220 may receive one or more first Radio Resource Control (RRC) information elements relating to a list of TCI states including a plurality of transmission configuration indication (TCI) states applicable to a plurality of types of channels, and one or more second RRC information elements relating to configuration of one or more serving cells or one or more bandwidth parts. When the first RRC information element is not associated with a specific serving cell or a specific bandwidth part, the control section 210 may discriminate one or more TCI states used for the specific serving cell or the specific bandwidth part based on the first RRC information element and the second RRC information element. The transmitting/receiving section 220 may receive a Medium Access Control (MAC) control element indicating a serving cell or bandwidth part to be activated among the one or more serving cells or the one or more bandwidth parts (first and third embodiments).

The first RRC information element and/or the second RRC information element may be configured for each serving cell or bandwidth part, or may be configured for a plurality of serving cells or a plurality of bandwidth parts (first and second embodiments).

When a specific pseudo co-location (QCL) type reference signal specific to a serving cell or specific to a bandwidth part is configured, configuration information of a first QCL type and configuration information of a second QCL type in each of the plurality of TCI states need not include information regarding the serving cell and information regarding the bandwidth part (first embodiment).

When a specific pseudo co-location (QCL) type reference signal common to a serving cell or common to a bandwidth part is configured, configuration information of a first QCL type in each of the plurality of TCI states need not include information regarding the serving cell and information regarding the bandwidth part, and configuration information of a second QCL type in each of the plurality of TCI states may include information regarding the serving cell and information regarding the bandwidth part (first embodiment).

(Hardware Configuration)

Note that the block diagrams that have been used to describe the above embodiments illustrate blocks in functional units. These functional blocks (components) may be implemented using arbitrary combinations of hardware and/ or software. Further, the method for implementing each functional block is not particularly limited. That is, each functional block may be implemented using a single apparatus obtained through physical or logical aggregation, or may be implemented by directly or indirectly connecting two or more physically or logically separate apparatuses (in a wired manner, wirelessly, or the like, for example) and using these apparatuses. Functional block may be implemented by combining software with the above-described one apparatus or the above-described plurality of apparatuses.

Here, functions include, but are not limited to, discriminating, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating (mapping), assigning, and the like. For example, a functional block (component) that has a transmission function may be referred to as a transmitting unit, a transmitter, and the like. In any case, as described above, the implementation method is not particularly limited.

Figure 19:
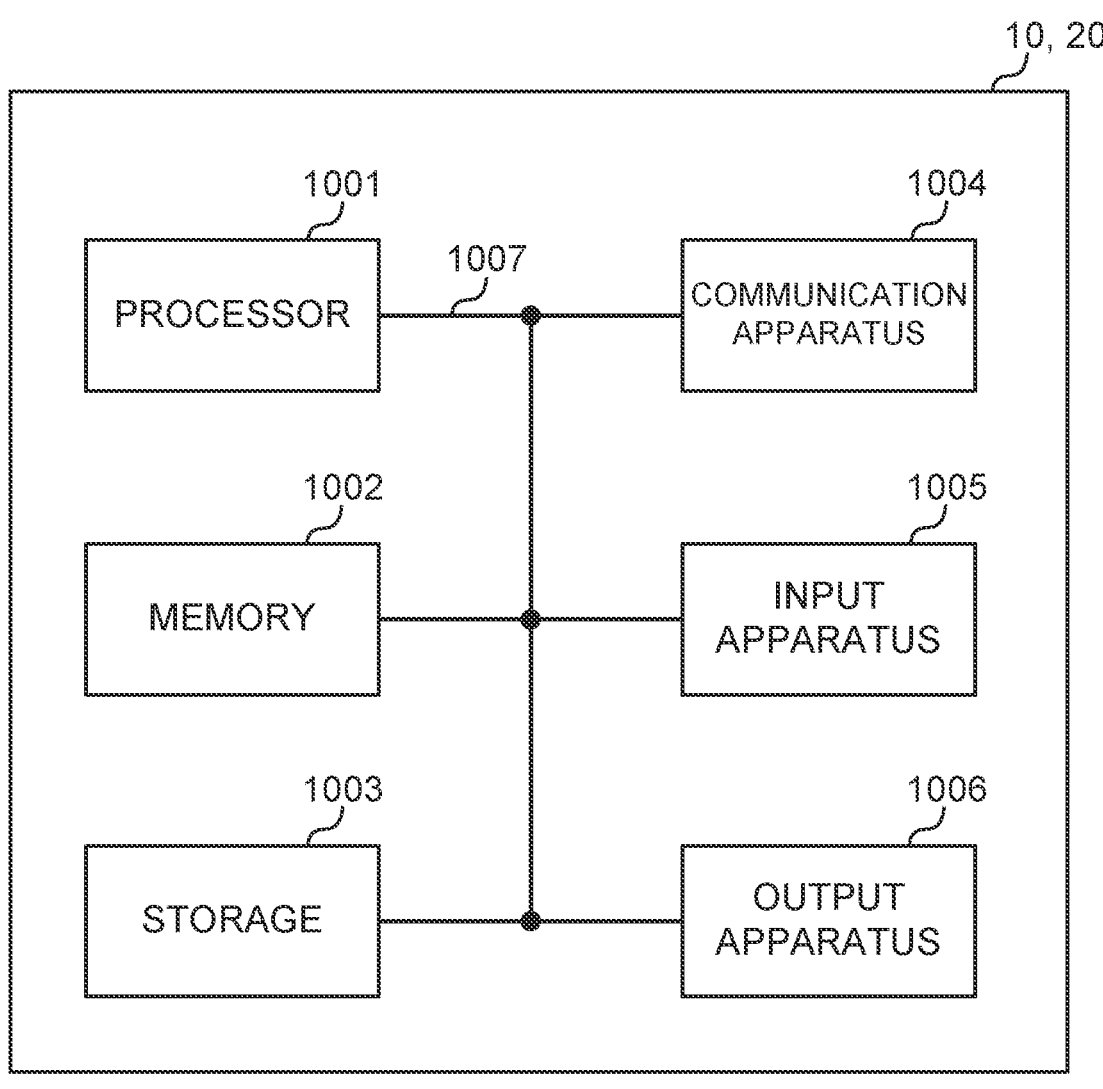
FIG. 19 is a diagram illustrating an example of a hardware configuration of a base station and a user terminal according to one embodiment.

For example, the base station, the user terminal, and the like according to one embodiment of the present disclosure may function as a computer that executes the processing of the radio communication method of the present disclosure. FIG. 19 is a diagram illustrating an example of a hardware configuration of the base station and the user terminal according to one embodiment. Physically, the above-described base station 10 and user terminal 20 may be constituted as a computer apparatus that includes a processor 1001, a memory 1002, a storage 1003, a communication apparatus 1004, an input apparatus 1005, an output apparatus 1006, a bus 1007, and the like.

Note that, in the present disclosure, terms such as apparatus, circuit, device, section, or unit are interchangeable. The hardware configuration of the base station 10 and the user terminal 20 may be constituted to include one or more of the apparatuses illustrated in the drawings, or may be constituted not to include some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented using one or more chips.

Each function of the base station 10 and the user terminal 20 is implemented by given software (program) being read on hardware such as the processor 1001 and the memory 1002, for example, by which the processor 1001 performs operations, controlling communication via the communication apparatus 1004, and controlling reading and/or writing of data in the memory 1002 and the storage 1003.

The processor 1001 controls the whole computer by, for example, running an operating system. The processor 1001 may be constituted by a central processing unit (CPU) including an interface with peripheral equipment, and a control apparatus, an operation apparatus, a register, and the like. For example, at least part of the above-described control section 110 (210), transmitting/receiving section 120 (220), and the like may be implemented by the processor 1001.

Further, the processor 1001 reads a program (program code), a software module, data, and the like from the storage 1003 and/or the communication apparatus 1004 into the memory 1002, and performs various types of processing according to this program, software module, data, and the like. As the program, a program that causes a computer to execute at least a part of the operation described in the above-described embodiment is used. For example, the control section 110 (210) may be implemented by a control program that is stored in the memory 1002 and that operates in the processor 1001, and other functional blocks may be similarly implemented.

The memory 1002 is a computer-readable recording medium, and may be constituted by, for example, at least one of a Read Only Memory (ROM), an Erasable Programmable ROM (EPROM), an Electrically EPROM (EE-PROM), a Random Access Memory (RAM), or other appropriate storage media. The memory 1002 may be referred to as a register, a cache, a main memory (primary storage apparatus), and the like. The memory 1002 is capable of storing a program (program code), a software module, and the like that are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a Compact Disc ROM (CD-ROM) or the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as a secondary storage apparatus.

The communication apparatus 1004 is hardware (transmitting/receiving device) for performing inter-computer communication via a wired network and/or a wireless network, and is referred to as, for example, a network device, a network controller, a network card, a communication module, and the like. The communication apparatus 1004 may be constituted to include, for example, a high frequency switch, a duplexer, a filter, a frequency ill synthesizer, and the like in order to implement, for example, Frequency Division Duplex (FDD) and/or Time Division Duplex (TDD). For example, the transmitting/receiving section 120 (220), the transmitting/receiving antenna 130 (230), and the like described above may be implemented by the communication apparatus 1004. The transmitting/receiving section 120 (220) may be implemented by being physically or logically separated into the transmitting section 120a (220a) and the receiving section 120b (220b).

The input apparatus 1005 is an input device for receiving inputs from the outside (for example, a keyboard, a mouse, a microphone, a switch, a button, a sensor, and the like). The output apparatus 1006 is an output device that performs outputs to the outside (for example, a display, a loudspeaker, a Light Emitting Diode (LED) lamp, or the like). Note that the input apparatus 1005 and the output apparatus 1006 may be provided in an integrated configuration (for example, a touch panel).

Furthermore, apparatuses such as the processor 1001 and the memory 1002 are connected by the bus 1007 for communicating information. The bus 1007 may be constituted using a single bus, or may be constituted by buses that vary between apparatuses.

Further, the base station 10 and the user terminal 20 may be constituted to include hardware such as a microprocessor, a Digital Signal Processor (DSP), an Application Specific Integrated Circuit (ASIC), a Programmable Logic Device (PLD), or a Field Programmable Gate Array (FPGA), and some or all of the functional blocks may be realized by using the hardware. For example, the processor 1001 may be implemented using at least one of these pieces of hardware.

(Variations)

Note that terms described in the present disclosure and terms necessary for understanding the present disclosure may be replaced with terms that have the same or similar meanings. For example, channel, symbol, and signal (signal or signaling) are interchangeable. Further, a signal may be a message. A reference signal can be abbreviated as RS, and may also be referred to as a pilot, a pilot signal, and so on, depending on which standard applies. In addition, a Component Carrier (CC) may be referred to as a cell, a frequency carrier, a carrier frequency, and so on.

A radio frame may be constituted by one or more periods (frames) in the time domain. Each of the one or more periods (frames) constituting a radio frame may be referred to as a subframe. Further, a subframe may be constituted by one or more slots in the time domain. A subframe may be a fixed duration (for example, 1 ms) that is not dependent on numerology.

Here, the numerology may be a communication parameter used for transmission and/or reception of a certain signal or channel. For example, the numerology may indicate at least one of SubCarrier Spacing (SCS), a bandwidth, a symbol length, a cyclic prefix length, a Transmission Time Interval (TTI), the number of symbols per TTI, a radio frame configuration, specific filter processing performed by a transceiver in the frequency domain, or specific windowing processing performed by a transceiver in the time domain.

The slot may be constituted by one or more symbols in the time domain (Orthogonal Frequency Division Multiplexing (OFDM) symbols, Single Carrier Frequency Division Multiple Access (SC-FDMA) symbols, and the like). Further, a slot may be a time unit based on numerology.

A slot may include a plurality of mini slots. Each mini slot may be constituted by one or more symbols in the time domain. Further, a mini slot may be referred to as a subslot. A mini slot may by constituted by fewer symbols than a slot. A PDSCH (or PUSCH) transmitted in a time unit larger than a mini slot may be referred to as PDSCH (PUSCH) mapping type A. A PDSCH (or a PUSCH) transmitted using a mini slot may be referred to as PDSCH (PUSCH) mapping type B.

A radio frame, a subframe, a slot, a mini slot and a symbol all represent the time unit when a signal is being transmitted. The radio frame, the subframe, the slot, the mini slot, and the symbol may be called by other applicable names, respectively. Note that time units such as frame, subframe, slot, mini slot, and symbol in the present disclosure are interchangeable.

For example, one subframe may be referred to as a TTI, a plurality of consecutive subframes may be referred to as TTIs, or one slot or one mini slot may be referred to as a TTI. That is, the subframe and/or the TTI may be a subframe (1 ms) in the existing LTE, may be a period shorter than 1 ms (for example, one to thirteen symbols), or may be a period longer than 1 ms. Note that the unit representing the TTI may be referred to as a slot, a mini slot, and so on, instead of a subframe.

Here, a TTI refers to the minimum time unit of scheduling in radio communication, for example. For example, in an LTE system, a base station performs scheduling to allocate radio resources (a frequency bandwidth, transmit power, and the like that can be used in each user terminal) to each user terminal in TTI units. Note that the definition of TTI is not limited thereto.

The TTI may be a transmission time unit of a channel-coded data packet (transport block), a code block, a codeword, and the like or may be a processing unit of scheduling, link adaptation, and the like. Note that, when the TTI is given, a time interval (for example, the number of symbols) to which a transport block, a code block, a codeword, or the like is actually mapped may be shorter than the TTI.

Note that, when one slot or one mini slot is referred to as a TTI, one or more TTIs (that is, one or more slots or one or more mini slots) may be the minimum time unit of scheduling. Also, the number of slots (the number of mini slots) constituting this minimum time unit for scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, and so on. A TTI that is shorter than a usual TTI may be referred to as a shortened TTI, a short TTI, a partial TTI (a partial TTI or a fractional TTI), a shortened subframe, a short subframe, a mini slot, a subslot, a slot, and so on.

Note that a long TTI (for example, a normal TTI, a subframe, and the like) is interchangeable with a TTI having a time duration exceeding 1 ms, and a short TTI (for example, a shortened TTI) is interchangeable with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in an RB may be the same regardless of the numerology, and may be twelve, for example. The number of subcarriers included in an RB may also be determined based on a numerology.

Further, an RB may include one or more symbols in the time domain, and may be one slot, one mini slot, one subframe or one TTI in length. One TTI, one subframe, and so on may each be constituted by one or more resource blocks.

Note that one or more RBs may be referred to as a Physical Resource Block (PRB), a Sub-Carrier Group (SCG), a Resource Element Group (REG), a PRB pair, an RB pair, and so on.

Furthermore, a resource block may be constituted by one or more Resource Elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, a common RB may be specified by the index of the RB based on a common reference point of the carrier. PRBs may be defined by a certain BWP and numbered within the BWP.

The BWP may include a UL BWP (BWP for UL) and a DL BWP (BWP for DL). For the UE, one or more BWPs may be configured within one carrier.

At least one of the configured BWPs may be active, and it need not be assumed that the UE transmits/receives a given signal/channel outside the active BWP. Note that "cell", "carrier", and so on in the present disclosure is interchangeable with "BWP".

Note that the structures of radio frames, subframes, slots, mini slots, symbols, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Further, the information, parameters, and the like described in the present disclosure may be represented using absolute values, or may be represented using relative values with respect to given values, or may be represented using other corresponding information. For example, a radio resource may be specified by a given index.

The names used for parameters and the like in the present disclosure are in no respect limiting. Further, any mathematical expression or the like that uses these parameters may differ from those explicitly disclosed in the present disclosure. Because various channels (PUCCH, PDCCH, and the like) and information elements can be identified by any suitable names, various names allocated to these various channels and information elements are not restrictive names in any respect.

The information, signals, and the like described in the present disclosure may be represented using any of a variety of different technologies. For example, data, instructions, commands, information, signals, bits, symbols and chips, all of which may be referenced throughout the herein-contained description, may be represented by voltages, currents, electromagnetic waves, magnetic fields or magnetic particles, optical fields or photons, or any combination thereof.

In addition, information, signals, and the like can be outputted in a direction from a higher layer to a lower layer and/or a direction from a lower layer to a higher layer. Information, signals, and the like may be inputted and outputted via a plurality of network nodes.

The information, signals, and the like that are inputted may be saved in a specific location (for example, a memory), or may be managed using a management table. The information, signals, and the like which are inputted and outputted can be overwritten, updated, or appended. The outputted information, signals, and the like may be deleted. The information, signals, and the like that are inputted may also be transmitted to other apparatuses.

Notification of information may be performed, not only by using the aspects/embodiments described in the present disclosure, but also using another method. For example, the notification of information in the present disclosure may be performed by using physical layer signaling (for example, Downlink Control Information (DCI) or Uplink Control Information (UCI)), higher layer signaling (for example, Radio Resource Control (RRC) signaling, broadcast information (Master Information Block (MIB)), System Information Block (SIB), or the like), or Medium Access Control (MAC) signaling), another signal, or a combination thereof.

Note that the physical layer signaling may be referred to as Layer 1/Layer 2 (L1/L2) control information (L1/L2 control signal), L1 control information (L1 control signal), and so on. Further, the RRC signaling may be referred to as an RRC message, and may be, for example, an RRC Connection Setup message, an RRC Connection Reconfiguration message, and so on. Further, notification of the MAC signaling may be performed using, for example, a MAC Control Element (CE).

Also, the notification of given information (for example, the notification of information to the effect that "X holds") does not necessarily have to be sent explicitly, and can be sent implicitly (for example, by not performing notification of this given information, or by performing notification of another piece of information).

Judgments may be made using values represented by one bit (0 or 1), may be made using Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, instructions, information and the like may be transmitted and received via communication media. For example, when software is transmitted from a website, a server, or another remote source by using a wired technology (coaxial cable, optical fiber cable, twisted pair, Digital Subscriber Line (DSL), or the like) and/or a wireless technology (infrared rays, microwaves, and the like), the wired technology and/or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "Quasi-Co-Location (QCL)", "Transmission Configuration Indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" may be used interchangeably.

In the present disclosure, terms such as "base station (BS)", "radio base station", "fixed station", "NodeB", "eNB (eNodeB)", "gNB (gNodeB)", "access point", "transmission point (TP)", "reception point (RP)", "transmission/reception point (TRP)", "panel", "cell", "sector", "cell group", "carrier", and "component carrier", can be used interchangeably. The base station is sometimes referred to using terms such as a macro cell, a small cell, a femto cell, or a pico cell.

The base station is capable of accommodating one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (Remote Radio Head (RRH))). The term "cell" or "sector" refers to a part or the whole of a coverage area of the base station and/or the base station subsystem that performs a communication service in this coverage.

In the present disclosure, terms such as "Mobile Station (MS)", "user terminal", "User Equipment (UE)", and "terminal" may be used interchangeably.

The mobile station may be referred to as a subscriber station, mobile unit, subscriber station, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

The base station and/or the mobile station may be called a transmitting apparatus, a receiving apparatus, a wireless communication apparatus, and the like. Note that the base station and/or the mobile station may be a device mounted on a moving object, the moving object itself, or the like. The moving object may be a means of transportation (for example, a car, an airplane, or the like), an unmanned moving object (for example, a drone, an autonomous car, or the like), or a (manned or unmanned) robot. Note that the base station and/or the mobile station also includes an apparatus that does not necessarily move during a communication operation. For example, the base station and/or the mobile station may be an Internet of Things (IoT) device such as a sensor.

Further, base station in the present disclosure is interchangeable with user terminal. For example, each aspect/embodiment of the present disclosure may be applied to a configuration in which communication between the base station and the user terminal is replaced with communication between a plurality of user terminals (which may be referred to as, for example, Device-to-Device (D2D), Vehicle-to-Everything (V2X), and so on). In this case, the user terminal 20 may have the functions of the base station 10 described above. Furthermore, words such as "uplink" and "downlink" are interchangeable with words corresponding to terminal-to-terminal communication (for example, "sidelink"). For example, uplink channel, downlink channel, and the like are interchangeable with side channel.

Likewise, user terminal in the present disclosure is interchangeable with base station. In this case, the base station 10 may have the functions of the user terminal 20 described above.

In the present disclosure, an operation performed by the base station may also be performed by an upper node thereof in some cases. In a network including one or more network nodes having base stations, it is clear that various operations performed for communication with a terminal can be performed by a base station, or one or more network nodes (examples of which include but are not limited to Mobility Management Entity (MME) and Serving-Gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, the methods described in the present disclosure have presented various step elements using an exemplary order, and are not limited to the presented specific order.

Each aspect/embodiment described in the present disclosure may be applied to a system using Long-Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (3 MB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next-generation system expanded on the basis of the foregoing, and the like. Further, a plurality of systems may be combined (for example, a combination of LTE or LTE-A and 5G, and the like) and applied.

The phrase "based on" as used in the present disclosure does not mean "based only on", unless otherwise specified. In other words, the phrase "based on" means both "based only on" and "based at least on".

All references to the elements using designations such as "first" and "second" as used in the present disclosure do not generally limit the amount or sequence of these elements. These designations can be used in the present disclosure as a convenient way of distinguishing between two or more elements. In this way, reference to the first and second elements does not imply that only two elements may be employed, or that the first element must precede the second element in some way.

The term "discriminating (determining)" as used in the present disclosure may include a wide variety of actions. For example, "discriminating (determining)" may be regarded as judging, calculating, computing, processing, deriving, investigating, looking up (or searching or inquiring) (for example, looking up in a table, database, or another data structure), ascertaining, and the like.

Furthermore, "discriminating (determining)" may be interpreted to mean discriminating (determining) actions such as receiving (for example, receiving information), transmitting (for example, transmitting information), inputting, outputting, accessing (for example, accessing data in a memory), and so on.

In addition, "discriminating (determining)" may be interpreted to mean "discriminating (determining)" actions such as resolving, selecting, choosing, establishing, comparing, and so on. In other words, "discriminating (determining)" may be interpreted to mean discriminating (determining) some kind of action.

In addition, "discriminating (determining)" is interchangeable with "assuming", "expecting", "considering", and so on.

The "maximum transmit power" described in the present disclosure may mean the maximum value of the transmit power, the nominal UE maximum transmit power, or the rated UE maximum transmit power.

The terms "connected" and "coupled" used in the present disclosure, or any variation of these terms mean all direct or indirect connections or couplings between two or more elements, and may include the presence of one or more intermediate elements between two elements that are "connected" or "coupled" to each other. The coupling or connection between the elements may be physical, logical, or a combination thereof. For example, "connection" is interchangeable with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the phrase "A and B are different" may mean "A and B are different from each other". Note that this phrase may mean that "A and B are different from C". Terms such as "separate", "coupled", and the like may also be interpreted similarly to "different".

When "include", "including", and variations of these terms are used in the present disclosure, these terms are intended to be inclusive similarly to the term "comprising". Moreover, the term "or" used in the present disclosure is intended to be not an exclusive-OR.

In the present disclosure, when articles are added in translation, as in, for example, "a", "an", and "the" in English, the present disclosure may incorporate the fact that the nouns following these articles are plural.

The invention according to the present disclosure has been described in detail hereinabove; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Thus, the description of the present disclosure is for the purpose of describing examples and does not bring any limiting meaning to the invention according to the present disclosure.

This application is based on Japanese Patent Application No. 2021-090578 filed on May 28, 2021. The contents of this are all incorporated herein.

The invention claimed is:

1. A terminal comprising:

a receiver that receives a radio resource control (RRC) parameter regarding a list of transmission configuration indication (TCI) states including a plurality of TCI states applicable to a plurality of types of channels and signals, the list being applied to each of a plurality of serving cells or bandwidth parts (BWPs); and a processor that determines, based on the RRC parameter, a TCI state applied to each of the plurality of serving cells or BWPs, wherein when a reference signal of a specific first quasi co-location (QCL) type is configured for each of the plurality of serving cells or BWPs, configuration information for the first QCL type and configuration information for a second QCL type that are included in each of the plurality of TCI states do not include information regarding a serving cell and information regarding a BWP.

2. The terminal according to claim 1, wherein when a reference signal of the first QCL type is configured in common in each of the plurality of serving cells or BWPs, the configuration information for the first QCL type included in each of the plurality of TCI states includes the information regarding the serving cell and the information regarding the BWP, and the configuration information for the second QCL type included in each of the plurality of TCI states does not include the information regarding the serving cell and the information regarding the BWP.

3. A radio communication method for a terminal, comprising:

receiving a radio resource control (RRC) parameter regarding a list of transmission configuration indication (TCI) states including a plurality of TCI states applicable to a plurality of types of channels and signals, the list being applied to each of a plurality of serving cells or bandwidth parts (BWPs); and determining, based on the RRC parameter, a TCI state applied to each of the plurality of serving cells or BWPs, wherein when a reference signal of a specific first quasi co-location (QCL) type is configured for each of the plurality of serving cells or BWPs, configuration information for the first QCL type and configuration information for a second QCL type that are included in each of the plurality of TCI states do not include information regarding a serving cell and information regarding a BWP.

4. A base station comprising:

a transmitter that transmits a radio resource control (RRC) parameter regarding a list of transmission configuration indication (TCI) states including a plurality of TCI states applicable to a plurality of types of channels and signals, the list being applied to each of a plurality of serving cells or bandwidth parts (BWPs); and a processor that controls, when a reference signal of a specific first quasi co-location (QCL) type is configured for each of the plurality of serving cells or BWPs, to not include information regarding a serving cell and information regarding a BWP in configuration information for the first QCL type and configuration information for a second QCL type that are included in each of the plurality of TCI states.

5. A system comprising a terminal and a base station, wherein the terminal comprises:

a receiver that receives a radio resource control (RRC) parameter regarding a list of transmission configuration indication (TCI) states including a plurality of TCI states applicable to a plurality of types of channels and signals, the list being applied to each of a plurality of serving cells or bandwidth parts (BWPs); and a processor that determines, based on the RRC parameter, a TCI state applied to each of the plurality of serving cells or BWPs, and the base station comprises a transmitter that transmits the RRC parameter, wherein when a reference signal of a specific first quasi co-location (QCL) type is configured for each of the plurality of serving cells or BWPs, configuration information for the first QCL type and configuration information for a second QCL type that are included in each of the plurality of TCI states do not include information regarding a serving cell and information regarding a BWP.

* * * * *